United States Patent
Kodama

(10) Patent No.: US 12,457,913 B2
(45) Date of Patent: Nov. 4, 2025

(54) AUTOMATIC TRAVELING SYSTEM, AUTOMATIC TRAVELING METHOD, AND AUTOMATIC TRAVELING PROGRAM

(71) Applicant: Yanmar Holdings Co., Ltd., Osaka (JP)

(72) Inventor: Maroi Kodama, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 308 days.

(21) Appl. No.: 18/025,362

(22) PCT Filed: Sep. 13, 2021

(86) PCT No.: PCT/JP2021/033448
§ 371 (c)(1),
(2) Date: Mar. 8, 2023

(87) PCT Pub. No.: WO2022/065091
PCT Pub. Date: Mar. 31, 2022

(65) Prior Publication Data
US 2023/0320246 A1    Oct. 12, 2023

(30) Foreign Application Priority Data

Sep. 23, 2020   (JP) ................. 2020-158531

(51) Int. Cl.
*A01B 69/04*   (2006.01)
*A01B 76/00*   (2006.01)
*B60T 8/32*    (2006.01)

(52) U.S. Cl.
CPC .......... *A01B 69/008* (2013.01); *A01B 76/00* (2013.01); *B60T 8/321* (2013.01)

(58) Field of Classification Search
None
See application file for complete search history.

(56) References Cited

U.S. PATENT DOCUMENTS 8,412,449 B2 * 4/2013 Trepagnier .......... G05D 1/0248
                                                            701/28
9,526,199 B2 * 12/2016 Matsuzaki ............. A01B 69/00
(Continued)

FOREIGN PATENT DOCUMENTS

JP    2017174229 A    9/2017
JP      6531055 B2    6/2019
(Continued)

OTHER PUBLICATIONS

Notice of Reasons For Refusal—Application No.: Japanese Patent Application No. 2020-158531 Date: Aug. 19, 2024.
(Continued)

*Primary Examiner* — Daniel L Greene
(74) *Attorney, Agent, or Firm* — Chris Mizumoto

(57) ABSTRACT

A positioning unit measures the position of a tractor. An automatic traveling control unit causes the tractor to automatically travel according to a target route on the basis of positioning information of the positioning unit. In the case where the tractor changes its direction on a direction change route, when the distance from a field to an end position at which the front-rear direction of the tractor is switched is less than a predetermined distance, the automatic traveling controller executes deceleration processing of decelerating a target speed of the tractor toward the end position.

10 Claims, 23 Drawing Sheets

(56) References Cited

U.S. PATENT DOCUMENTS

| | | |
|---|---|---|
| 2017/0144702 A1 | 5/2017 | Dang et al. |
| 2018/0345963 A1* | 12/2018 | Maura ................ B60W 60/0011 |
| 2020/0359547 A1* | 11/2020 | Sakaguchi .......... B60W 60/005 |
| 2020/0409371 A1* | 12/2020 | Ueda .................. G01C 21/3415 |

FOREIGN PATENT DOCUMENTS

| | | |
|---|---|---|
| JP | 2020030760 A | 2/2020 |
| JP | 2020107021 A | 7/2020 |

OTHER PUBLICATIONS

Supplementary European Search Report—Ref. No. BBS209707PCTEP Date: Sep. 19, 2024.

* cited by examiner

AUTOMATIC TRAVELING SYSTEM, AUTOMATIC TRAVELING METHOD, AND AUTOMATIC TRAVELING PROGRAM

CROSS-REFERENCE

This application is a US National Stage Application under 35 U.S.C. § 371 of International Application No. PCT/JP2021/033448 filed Sep. 13, 2021, which claims foreign priority of JP2020-158531 filed Sep. 23, 2020 and the disclosures of which are hereby incorporated by reference in their entirety.

TECHNICAL FIELD

The present invention relates to an automatic traveling system, an automatic traveling method, and an automatic traveling program capable of causing a work vehicle to automatically travel.

BACKGROUND ART

Some automatic traveling systems include a target route generator that generates a target route, on which a work vehicle can automatically travel, by performing a step of inputting a work range of work equipment provided at a rear portion of the work vehicle, a step of setting a work area in a field, a step of setting a work start position and a work stop position, a step of setting a reference traveling start direction, a step of setting headlands at both ends of the work area, a step of setting a traveling route in the field, and the like (see, e.g., Patent Document 1).

PRIOR ART DOCUMENT

Patent Document

Patent Document 1: WO 2015/119263 A

SUMMARY OF INVENTION

Technical Problem

For example, in the automatic traveling system, in a case where the work vehicle is switched from forward movement to backward movement in order to change the direction of the work vehicle, the work vehicle may be decelerated before a target position, at which forward/backward movement is switched, so as to temporarily stop at the target position. When such deceleration control is performed, a problem that a work efficiency is degraded because it takes time to change the direction is caused. On the other hand, in a case where the deceleration control is not performed, the time required for changing the direction can be shortened, but the work vehicle cannot be stopped at the target position, leading to a problem that the work vehicle travels out of the field and the automatic traveling thereof is stopped accordingly. As a result, the work efficiency is degraded.

An object of the present invention is to provide an automatic traveling system, an automatic traveling method, and an automatic traveling program capable of improving a work efficiency of a work vehicle by properly changing the direction of the work vehicle.

Solution to Problem

The automatic traveling system according to the present invention includes a route generation processor, a positioning processor, and a traveling processor. The route generation processor generates a target route including a work route on which a work vehicle moves forward on a field and a direction change route on which the work vehicle changes its direction. The positioning processor measures the position of the work vehicle. The traveling processor causes the work vehicle to automatically travel along the target route based on positioning information from the positioning processor. The traveling processor executes a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

The automatic traveling method according to the present invention is a method causing one or more processors to execute: generating a target route including a work route on which a work vehicle moves forward on a field and a direction change route on which the work vehicle changes its direction; measuring the position of the work vehicle; causing the work vehicle to automatically travel along the target route based on the position of the work vehicle; and executing a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

The automatic traveling program according to the present invention is a program causing one or more processors to execute: generating a target route including a work route on which a work vehicle moves forward on a field and a direction change route on which the work vehicle changes its direction; measuring the position of the work vehicle; causing the work vehicle to automatically travel along the target route based on the position of the work vehicle; and executing a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

Advantageous Effects of Invention

According to the present invention, the automatic traveling system, the automatic traveling method, and the automatic traveling program can be provided, which are capable of improving the work efficiency of the work vehicle by properly changing the direction of the work vehicle.

DESCRIPTION OF EMBODIMENTS

Hereinafter, as one example of a mode for carrying out the present invention, an embodiment in which an automatic traveling system for a work vehicle according to the present invention is applied to a tractor which is one example of the work vehicle will be described with reference to the drawings.

Note that in addition to the tractor, the automatic traveling system for the work vehicle according to the present invention is applicable to, for example, an autonomous riding-type work vehicle such as a riding-type power tiller, a riding-type mower, a riding-type rice transplanter, and a riding-type seed planter and an unmanned work vehicle such as an unmanned tiller and an unmanned mower.

Figure 1:
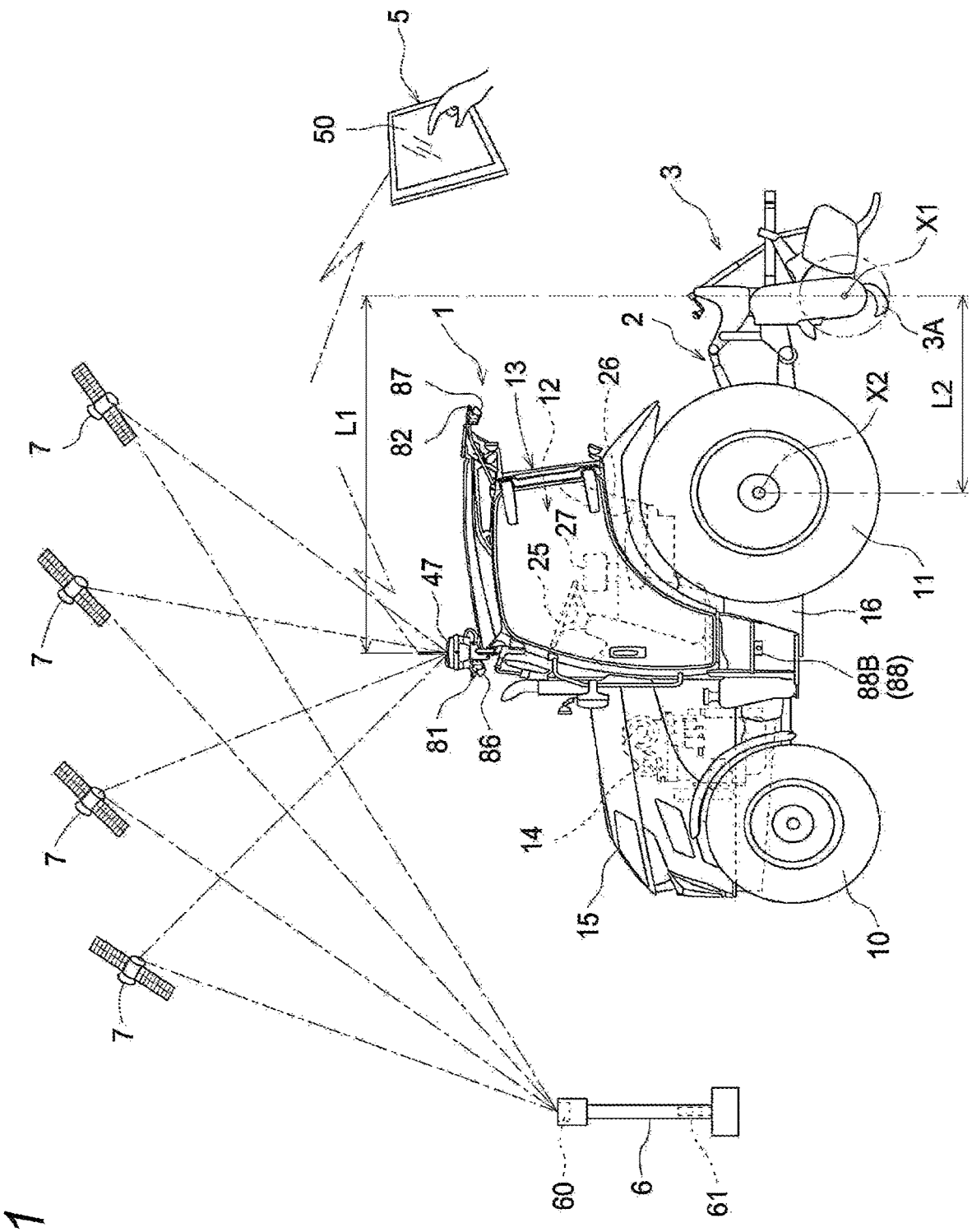
FIG. 1 is a view showing a schematic configuration of an automatic traveling system according to an embodiment of the present invention.

As shown in FIG. 1, rotary tilling equipment 3 which is one example of work equipment is coupled to a rear portion of a tractor 1, which is described as an example in the present embodiment, via a link mechanism 2 so as to move up and down and roll. Thus, the tractor 1 has rotary tilling specifications.

Note that instead of the rotary tilling equipment 3, work equipment such as a plow, a disc halo, a cultivator, a sub-soiler, seeding equipment, spraying equipment, mowing equipment, and harvesting equipment can be coupled to the rear portion of the tractor 1.

Figure 3:
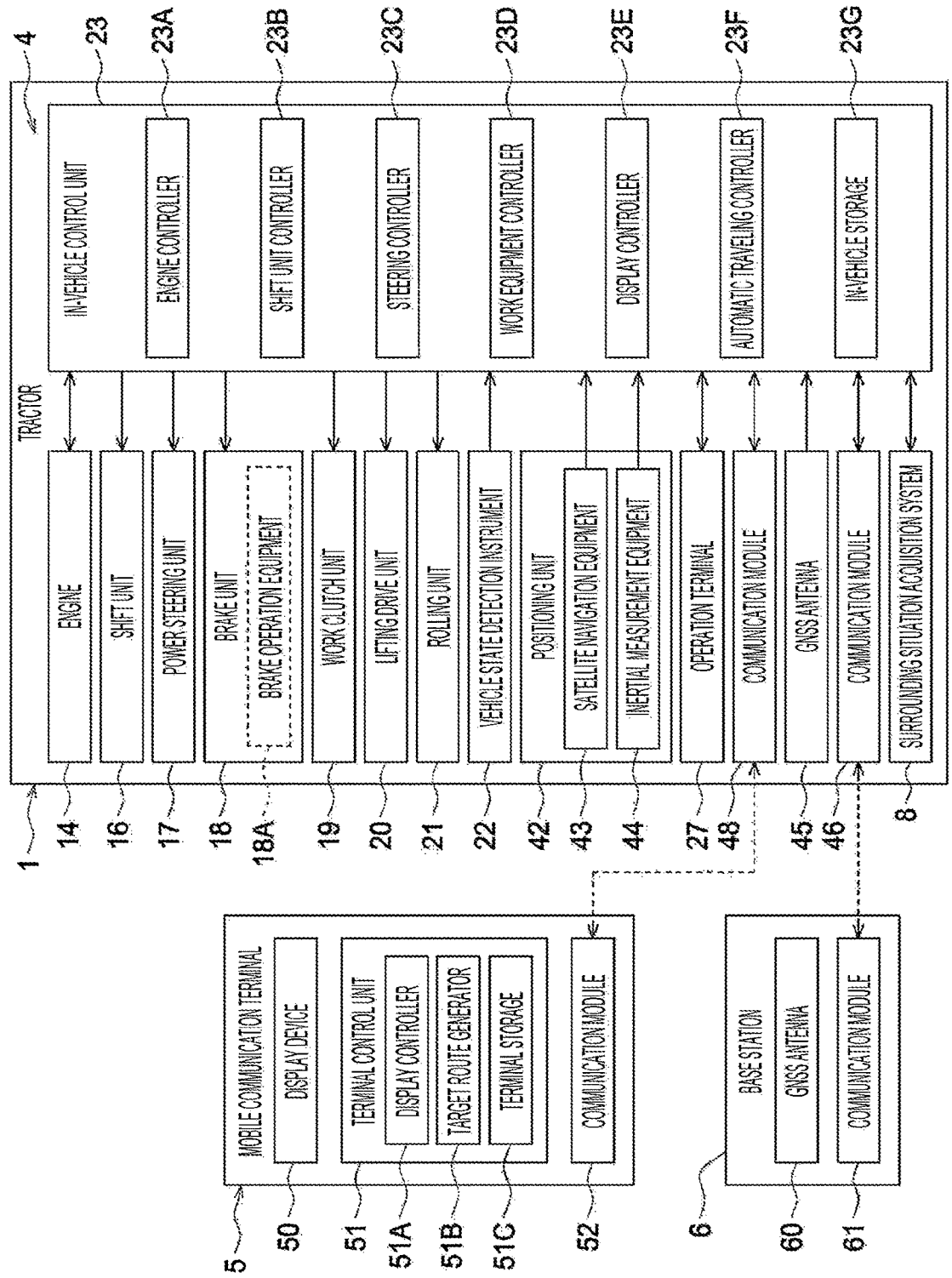
FIG. 3 is a block diagram showing the schematic configuration of the automatic traveling system according to the embodiment of the present invention.

With use of the automatic traveling system for the work vehicle, the tractor 1 can automatically travel in, e.g., a field A (see FIG. 5) which is one example of a work field. As shown in FIGS. 1 and 3, the automatic traveling system for the work vehicle includes an automatic traveling unit 4 mounted on the tractor 1 and a mobile communication terminal 5 which is one example of a wireless communication instrument set to wirelessly communicate with the automatic traveling unit 4, and the like. The mobile communication terminal 5 includes a multi-touch display device 50 that enables display of various types of information, input operation, and the like regarding automatic traveling.

Note that a tablet-type personal computer, a smartphone or the like can be employed as the mobile communication terminal 5. In addition, a wireless local area network (LAN) such as Wi-Fi (the registered trademark), near field communication such as Bluetooth (the registered trademark) and the like can be employed as wireless communication.

Figure 2:
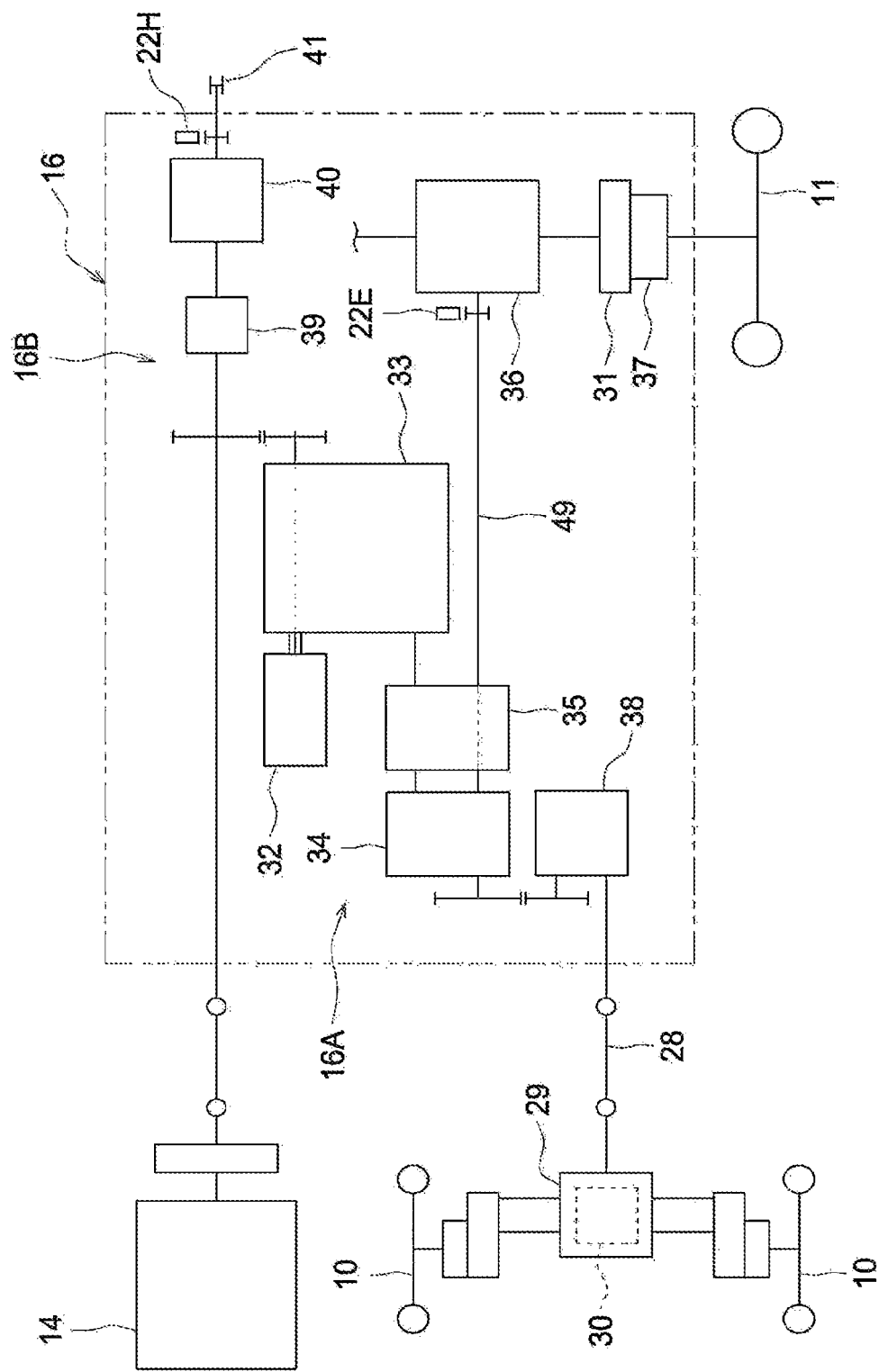
FIG. 2 is a schematic diagram showing a transmission configuration of a tractor according to the embodiment of the present invention.

As shown in FIGS. 1 and 2, the tractor 1 includes, as traveling equipment, right and left drivable and steerable front wheels 10 and right and left drivable rear wheels 11. As shown in FIGS. 1 to 3, the tractor 1 further includes a cabin 13 that forms a riding-type driver 12, an electronic control diesel engine (Hereinafter, referred to as an engine) 14 having a common rail system, a hood 15 that covers the engine 14 and the like, a shift unit 16 that shifts power from the engine 14, and the like. Note that as the engine 14, e.g., an electronic control gasoline engine having an electronic governor may be employed.

As shown in FIG. 3, the tractor 1 further includes an all-hydraulic power steering unit 17 that steers the right and left front wheels 10, a brake unit 18 that puts a brake on the right and left rear wheels 11, an electronic-hydraulic control work clutch unit 19 that intermittently transmits power to the rotary tilling equipment 3, an electronic-hydraulic control lifting drive unit 20 that lifts and lowers the rotary tilling equipment 3, an electronic-hydraulic control rolling unit 21 that enables the rotary tilling equipment 3 to be driven in a roll direction, a vehicle state detection instrument 22 that detects various setting states and operation states of each unit in the tractor 1 and has various sensors and switches, an in-vehicle control unit 23 having various controllers, and the like. Note that an electric type unit having an electric motor for steering may be employed for the power steering unit 17.

As shown in FIG. 1, the driver 12 includes a steering wheel 25 for manual steering, a passenger seat 26, and an operation terminal 27 that enables display of various types of information, input operation, and the like. Although not shown, the driver 12 includes operation levers such as an accelerator lever and a shift lever, operation pedals such as an accelerator pedal and a clutch pedal, and the like. As the operation terminal 27, a multi-touch liquid crystal monitor, a virtual terminal compatible with ISOBUS or the like may be employed.

As shown in FIG. 2, the shift unit 16 includes a traveling transmission system 16A that shifts power from the engine 14 to that for traveling and a work transmission system 16B that shifts power from the engine 14 to that for work. The power shifted by the traveling transmission system 16A is transmitted to the right and left front wheels 10 via a transmission shaft 28 for driving the front wheels, a front differential 30 built in a front axle case 29, and the like. In addition, the power shifted by the work transmission system 16B is transmitted to the rotary tilling equipment 3. The shift unit 16 further includes right and left brakes 31 that individually put a brake on the right and left rear wheels 11.

The traveling transmission system 16A includes electronic control main transmission 32 that shifts power from the engine 14, electronic-hydraulic control forward-backward movement switching equipment 33 that switches power from the main transmission equipment 32 between power for forward movement and power for backward movement, gear type auxiliary transmission 34 that shifts power for forward or rearward movement from the forward-backward movement switching equipment 33 at two levels, gear type creep transmission 35 that shifts power for forward or backward movement from the forward-backward movement switching equipment 33 to an ultra-low level, a rear differential 36 that distributes power from the auxiliary transmission 34 or the creep transmission 35 to the right and left rear wheels 11, right and left reduction gears 37 that decelerate power from the rear differential 36 and transmits the power to the right and left rear wheels 11, and electronic-hydraulic control transmission switching equipment 38 that switches power transmission from the auxiliary transmission equipment 34 or the creep transmission equipment 35 to the right and left front wheels 10, and the like.

The work transmission system 16B includes a hydraulic work clutch 39 that intermittently transmits power from the engine 14, work transmission 40 that switches power transmitted via the work clutch 39 at three levels of forward rotation and one level of reverse rotation, a PTO shaft 41 that outputs power from the work transmission 40 as power for work, and the like. The power from the PTO shaft 41 is transmitted to the rotary tilling equipment 3 via, e.g., an external transmission shaft (not shown). The work clutch 39 is included in the work clutch unit 19 together with an electromagnetic control valve (not shown) that controls the flow of oil to the work clutch 39.

As the main transmission 32, an integrated hydrostatic mechanical transmission (I-HMT) which is one example of a hydromechanical continuously variable transmission having a higher transmission efficiency than that of a hydrostatic continuously variable transmission (hydro-static transmission (HST)) is employed.

Note that instead of the I-HMT, a continuously variable transmission such as a hydraulic mechanical transmission (HMT) which is one example of a hydromechanical continuously variable transmission, a hydrostatic continuously variable transmission, or a belt type continuously variable transmission may be employed as the main transmission 32. Instead of the continuously variable transmission, an electronic-hydraulic control stepped transmission including a plurality of hydraulic shift clutches and a plurality of electromagnetic shift valves that controls the flow of oil in the shift clutches or the like may be employed.

The transmission switching equipment 38 switches the state of transmission to the right and left front wheels 10 among a transmission blocking state in which transmission to the right and left front wheels 10 is blocked, an equal speed transmission state in which power is transmitted to the right and left front wheels 10 such that the peripheral speed of the right and left front wheels 10 is the same as the peripheral speed of the right and left rear wheels 11, and a double speed transmission state in which power is transmitted to the right and left front wheels 11 such that the peripheral speed of the right and left front wheels 10 is about twice the peripheral speed of the right and left rear wheels 10. Accordingly, a drive state of the tractor 1 can be switched among a two-wheel drive state, a four-wheel drive state, and a front wheel double speed state.

Although not shown, the brake unit 18 includes the above-described right and left brakes 31, a foot brake system that operates the right and left brakes 31 in conjunction with an operation of stepping on right and left brake pedals provided in the driver 12, a parking brake system that operates the left and right brakes 31 in conjunction with operation of a parking lever provided in the driver 12, a turning brake system that operates the brake 31 on the inner side in turning in conjunction with steering of the right and left front wheels 10 at a set angle or more, and the like. The turning brake system includes electronic-hydraulic control brake operation equipment 18A capable of independently operating the right and left brakes 31.

Figure 4:
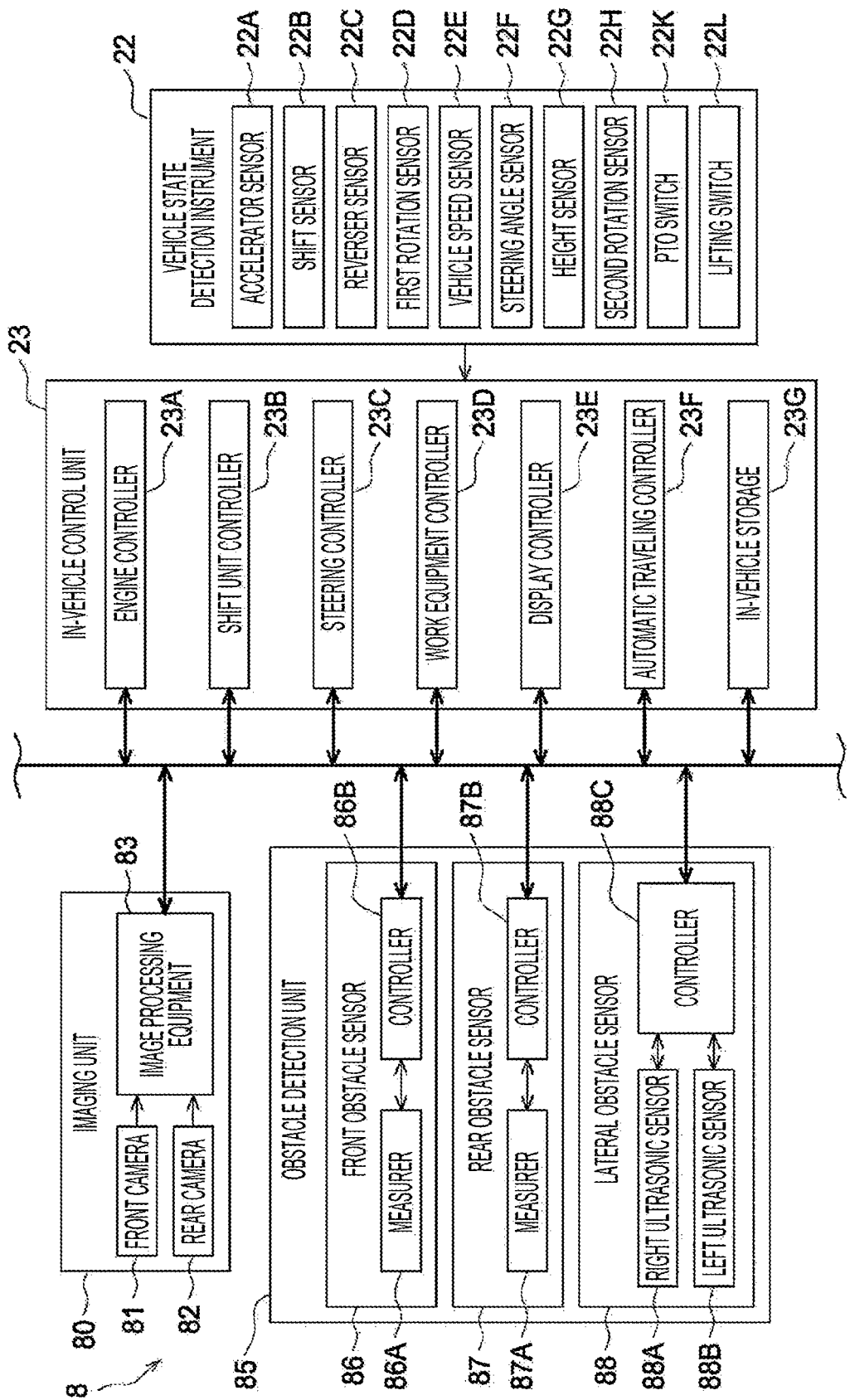
FIG. 4 is a block diagram showing schematic configurations of an obstacle detection unit according to the embodiment of the present invention.

The vehicle state detection instrument 22 is a generic term for various sensors, switches, and the like provided in each unit of the tractor 1. As shown in FIG. 4, the vehicle state detection instrument 22 includes an accelerator sensor 22A that detects an operation position of the accelerator lever, a shift sensor 22B that detects an operation position of the shift lever, a reverser sensor 22C that detects an operation position of a reverser lever for forward/backward movement switching, a first rotation sensor 22D that detects an output rotation speed of the engine 14, a vehicle speed sensor 22E that detects the speed of the tractor 1, a steering angle sensor 22F that detects the steering angle of the front wheel 10, a height sensor 22G that detects the height position of the rotary tilling equipment 3, a second rotation sensor 22H that detects the rotation speed of the PTO shaft 41 as the drive rotation speed of the rotary tilling equipment 3, and the like.

As shown in FIG. 2, a rotation sensor that detects the rotation speed and rotation direction of the transmission shaft 49 that transmits power from the auxiliary transmission 34 or the creep transmission 35 to the rear differential 36 is employed as the vehicle speed sensor 22E.

As shown in FIGS. 3 and 4, the in-vehicle control unit 23 includes an engine controller 23A that performs control regarding the engine 14, a shift unit controller 23B that performs control regarding the shift unit 16, such as control of the vehicle speed of the tractor 1 and switching of forward/backward movement, a steering controller 23C that performs control regarding steering, a work equipment controller 23D that performs control regarding the work equipment such as the rotary tilling equipment 3, a display controller 23E that performs control regarding display and notification on the operation terminal 27 or the like, an automatic traveling controller 23F that performs control regarding automatic traveling, a nonvolatile in-vehicle storage 23G that stores a target route P (see FIG. 5) generated for automatic traveling according to the field A, and the like. Each of the controllers 23A to 23F is built by an electronic control unit in which a microcontroller and the like are integrated, various control programs, and the like. The controllers 23A to 23F are mutually communicably connected to each other via a controller area network (CAN).

Note that for mutual communication among the controllers 23A to 23F, in-vehicle Ethernet, CAN with FLexible Data rate (CAN-FD), and the like, which are communication standards or next-generation communication standards other than the CAN may be employed.

Based on detection information from the accelerator sensor and detection information from the first rotation sensor 22D, the engine controller 23A executes, e.g., an engine rotation speed maintaining control of maintaining the engine rotation speed at a rotation speed corresponding to the operation position of the accelerator lever.

The shift unit controller 23B calculates the actual vehicle speed of the tractor 1 and determines a traveling direction of the tractor 1 based on detection information from the vehicle speed sensor 22E. The shift unit controller 23B executes a vehicle speed control of controlling operation of the main transmission 32 such that the vehicle speed of the tractor 1 is changed to a speed corresponding to the operation position of the shift lever based on detection information from the shift sensor 22B and the detection information from the vehicle speed sensor 22E, a forward/backward movement switching control of switching a transmission state of the forward-backward movement switching equipment 33 based on detection information from the reverser sensor 22C, and the like. The vehicle speed control includes a deceleration stop processing of decelerating the main transmission 32 to a zero speed state to stop traveling of the tractor 1 in a case where the shift lever is operated to a zero speed position.

The shift unit controller 23B switches, based on operation of a first selection switch (not shown) capable of selecting a traveling drive mode for the tractor 1, the traveling drive mode of the tractor 1 among a two-wheel drive mode, a four-wheel drive mode, a front wheel acceleration mode, a turning brake mode, and a front wheel acceleration turning brake mode. The first selection switch is provided in the driver 12, and is included in the vehicle state detection instrument 22.

In the two-wheel drive mode, the shift unit controller 23B switches the transmission switching equipment 38 to the transmission blocking state, thereby causing the tractor 1 to travel in a two-wheel drive state in which transmission to the right and left front wheels 10 is blocked and only the right and left rear wheels 11 are driven.

In the four-wheel drive mode, the shift unit controller 23B switches the transmission switching equipment 38 to an equal speed drive state, thereby causing the tractor 1 to travel in a four-wheel drive state in which power is transmitted to the right and left front wheels 10 and the right and left front wheels 10 and the right and left rear wheels 11 are driven at an equal speed.

In the front wheel acceleration mode, the shift unit controller 23B executes a front wheel shift control of switching the transmission switching equipment 38 between the equal speed transmission state and the double speed transmission state based on detection information from the steering angle sensor 22F. The front wheel shift control includes a front wheel acceleration processing of determining that the tractor 1 has started turning when the steering angle of the front wheel 10 reaches the set angle or more and switching the transmission switching equipment 38 from the equal speed transmission state to the double speed transmission state, and a front wheel deceleration processing of determining that the tractor 1 has finished turning when the steering angle of the front wheel 10 reaches less than the set angle and switching the transmission switching equipment 38 from the double speed transmission state to the equal speed transmission state. Accordingly, in the front wheel acceleration mode, the tractor 1 can travel in a front wheel acceleration state while the tractor 1 is turning, and the turning radius of the tractor 1 can be decreased.

In the turning brake mode, the shift unit controller 23B controls operation of the brake operation equipment 18A based on the detection information from the steering angle sensor 22F to execute a turning brake control of switching the right and left brakes 31 between a brake release state and a turning inner side braking state. The turning brake control includes a turning inner side braking processing of determining that the tractor 1 has started turning when the steering angle of the front wheel 10 reaches the set angle or more, determining a steering direction of the front wheel 10 from a direction of increasing or decreasing the steering angle in such a state, and switching the brake 31 on the inner side in turning from the braking release state to the braking state, and a brake release processing of determining that the tractor 1 has finished turning when the steering angle of the front wheel 10 reaches less than the set angle and switching the brake 31 in the braking state (on the inner side in turning) to the brake release state. Accordingly, in the turning brake mode, the tractor 1 can travel in the turning inner side braking state while the tractor 1 is turning, and the turning radius of the tractor 1 can be decreased.

In the front wheel acceleration turning brake mode, the shift unit controller 23B executes the above-described front wheel shift control and turning brake control based on the detection information from the steering angle sensor 22F. Accordingly, in the front wheel acceleration turning brake mode, the tractor 1 can travel in a front wheel acceleration turning inner side braking state while the tractor 1 is turning, and the turning radius of the tractor 1 can be decreased.

The work equipment controller 23D executes a work clutch control of controlling operation of the work clutch unit 19 based on, e.g., operation of a PTO switch 22K (see FIG. 4) provided in the driver 12, a lifting control of controlling operation of the lifting drive unit 20 based on operation of a lifting switch 22L (see FIG. 4) provided in the driver 12, a set value of a height setting dial, and the like, a rolling control of controlling operation of the rolling unit 21 based on a set value of a roll angle setting dial provided in the driver 12, and the like. The PTO switch 22K, the lifting switch 22L, the height setting dial, and the roll angle setting dial are included in the vehicle state detection instrument 22.

As shown in FIG. 3, the tractor 1 includes a positioning unit 42 that measures the position, orientation or the like of the tractor 1. The positioning unit 42 includes satellite navigation equipment 43 that measures the position and orientation of the tractor 1 using a global navigation satellite system (GNSS), which is one example of a satellite positioning system, an inertial measurement unit (IMU) 44 that has a three-axis gyroscope, a three-directional acceleration sensor and the like to measure the posture, orientation and the like of the tractor 1, and the like. A positioning method using the GNSS includes a differential GNSS (DGNSS: a relative positioning method) and a real time kinematic GNSS (RTK-GNSS: an interferometric positioning method). In the present embodiment, an RTK-GNSS suitable for positioning a mobile object is employed. Thus, as shown in FIG. 1, a base station 6 that enables positioning by the RTK-GNSS is placed at a known position around the field. The positioning unit 42 is one example of a positioning processor of the present invention.

As shown in FIGS. 1 and 3, each of the tractor 1 and the base station 6 includes a GNSS antenna 45, 60 that receive a radio wave transmitted from a positioning satellite 7 (see FIG. 1), a communication module 46, 61 that enables wireless communication of each piece of information, which includes positioning information, between the tractor 1 and the base station 6, and the like. With this configuration, the satellite navigation equipment 43 of the positioning unit 42 can measure the position and orientation of the tractor 1 with a high accuracy based on the positioning information obtained in such a manner that the GNSS antenna 45 of the tractor 1 receives the radio wave from the positioning satellite 7 and the positioning information obtained in such a manner that the GNSS antenna 60 of the base station 6 receives the radio wave from the positioning satellite 7. Since the positioning unit 42 includes the satellite navigation equipment 43 and the inertial measurement unit 44, the position, orientation, and posture angle (a yaw angle, a roll angle, a pitch angle) of the tractor 1 can be measured with a high accuracy.

In the tractor 1, the inertial measurement unit 44, the GNSS antenna 45, and the communication module 46 of the positioning unit 42 are included in an antenna unit 47 shown in FIG. 1. The antenna unit 47 is arranged at a center location in the right-left direction on the upper front side of the cabin 13.

Although not shown, the position (the positioning reference position) of the tractor 1 measured by the positioning unit 42 is set to the installation position of the GNSS antenna 45 on the tractor 1. The GNSS antenna 45 is placed at the center of the tractor 1 in the right-left direction on the upper front side of the cabin 13.

Note that the position of the tractor 1 measured by the positioning unit 42 may be set to the center position of the rear wheel axle of the tractor 1 instead of the installation position of the GNSS antenna 45. In this case, the position of the tractor 1 can be obtained from the positioning information from the positioning unit 42 and vehicle body information including a positional relationship between the attachment position of the GNSS antenna 45 on the tractor 1 and the center position of the rear wheel axle.

As shown in FIG. 3, the mobile communication terminal 5 includes an electronic control unit in which a microcontroller and the like are integrated, a terminal control unit 51 having various control programs, and the like. The terminal control unit 51 includes a display controller 51A that performs control regarding display and notification on the display device 50 or the like, a target route generator 51B that generates the target route P on which the tractor 1 can automatically travel, a nonvolatile terminal storage 51C that stores, e.g., the target route P generated by the target route generator 51B, and the like. The terminal storage 51C stores, as various types of information to be used for generating the target route P, the vehicle body information including the turning radius of the tractor 1, the work range of the rotary tilling equipment 3, and the like, field information including the position, shape, and the like of the field A, and the like.

The target route P is stored in the terminal storage 51C in association with the vehicle body information, the field information and the like, and can be displayed on the display device 50 of the mobile communication terminal 5. The target route P includes various types of information regarding automatic traveling, such as the traveling direction of the tractor 1, a target vehicle speed, the front wheel steering angle, a start position pa of automatic traveling, and an end position pb of automatic traveling.

As shown in FIG. 3, the tractor 1 and the mobile communication terminal 5 include communication modules 48, 52 that enable wireless communication of each piece of information, which includes the positioning information and the like, between the in-vehicle control unit 23 and the terminal control unit 51. In a case where Wi-Fi is employed for wireless communication with the mobile communication terminal 5, the communication module 48 of the tractor 1 functions as a converter that bidirectionally converts communication information between CAN and Wi-Fi. The terminal control unit 51 can acquire various types of information regarding the tractor 1, which includes the position, orientation, and the like of the tractor 1, via wireless communication with the in-vehicle control unit 23. With this configuration, the display device 50 of the mobile communication terminal 5 can display various types of information including the position, orientation, and the like of the tractor 1 with respect to the target route P.

In response to a transmission request command from the in-vehicle control unit 23, the terminal control unit 51 transmits the field information, the target route P, and the like stored in the terminal storage 51C to the in-vehicle control unit 23. The in-vehicle control unit 23 stores the received field information, target route P, and the like in the in-vehicle storage 23G. Regarding transmission of the target route P, the terminal control unit 51 may transmit all the target routes P from the terminal storage 51C to the in-vehicle control unit 23 at once before the tractor 1 starts traveling automatically, for example. The terminal control unit 51 may divide the target route P into plural pieces of divided route information for every predetermined distance, and sequentially transmit a predetermined number of pieces of divided route information corresponding to the order of traveling of the tractor 1 from the terminal storage 51C to the in-vehicle control unit 23 every time the traveling distance of the tractor 1 reaches the predetermined distance from a stage before the start of automatic traveling of the tractor 1.

The detection information from various sensors, switches, and the like included in the vehicle state detection instrument 22 is input to the automatic traveling controller 23F. Thus, the automatic traveling controller 23F can monitor various setting states, operation states and the like of each unit in the tractor 1.

In a case where the display device 50 of the mobile communication terminal 5 is operated to issue an instruction to start automatic traveling in a state in which various types of manual setting operations enabling automatic traveling of the tractor 1 are performed by a user such as a passenger or a manager and a traveling mode of the tractor 1 is switched from a manual traveling mode to an automatic traveling mode, the automatic traveling controller 23F starts an automatic traveling control of causing the tractor 1 to automatically travel along the target route P while acquiring the position, orientation, and the like of the tractor 1 by the positioning unit 42.

For example, during execution of the automatic traveling control, in a case where the user operates the display device 50 of the mobile communication terminal 5 to issue an instruction to end automatic traveling or a case where the user on the driver 12 operates a manual operation tool such as the steering wheel 25 or the accelerator pedal, the automatic traveling controller 23F ends the automatic traveling control and switches the traveling mode from the automatic traveling mode to the manual traveling mode.

The automatic traveling control by the automatic traveling controller 23F includes an engine automatic control processing of transmitting an automatic traveling control command regarding the engine 14 to the engine controller 23A, a vehicle speed automatic control processing of transmitting an automatic traveling control command regarding the vehicle speed of the tractor 1, switching of forward/backward movement, and the like to the shift unit controller 23B, a steering automatic control processing of transmitting an automatic traveling control command regarding steering to the steering controller 23C, a work automatic control processing of transmitting an automatic traveling control command regarding the work equipment such as the rotary tilling equipment 3 to the work equipment controller 23D, and the like.

In the engine automatic control processing, the automatic traveling controller 23F transmits, to the engine controller 23A, e.g., an engine rotation speed change command for changing the engine rotation speed based on a set rotation speed and the like included in the target route P. The engine controller 23A executes, e.g., an engine rotation speed change control of automatically changing the engine rotation speed according to various control commands regarding the engine 14, the control commands being transmitted from the automatic traveling controller 23F.

In the vehicle speed automatic control processing, the automatic traveling controller 23F transmits, to the shift unit controller 23B, a shift operation command for instructing a shift operation of the main transmission 32 based on the target vehicle speed included in the target route P, a forward/backward movement switching command for instructing a forward/backward movement switching operation of the forward/backward movement switching equipment based on the traveling direction of the tractor 1 included in the target route P, and the like. In response to various control commands, which are transmitted from the automatic traveling controller 23F, regarding the main transmission device 32, the forward/backward movement switching equipment and the like, the shift unit controller 23B executes an automatic vehicle speed control of automatically controlling operation of the main transmission 32, an automatic forward/backward movement switching control of automatically controlling operation of the forward/backward movement switching equipment, and the like. The automatic vehicle speed control includes an automatic deceleration stop processing of decelerating the main transmission 32 to the zero speed state to stop traveling of the tractor 1 in a case where the target vehicle speed included in the target route P is a zero speed, and the like, for example.

In the steering automatic control processing, the automatic traveling controller 23F transmits, to the steering controller 23C, e.g., a steering command for steering the right and left front wheels 10 based on the front wheel steering angle and the like included in the target route P. In response to the steering command transmitted from the automatic traveling controller 23F, the steering controller 23C executes an automatic steering control of controlling operation of the power steering unit 17 to steer the right and left front wheels 10, an automatic turning brake control of operating the brake unit 18 to operate the brake on the inner side in turning in a case where the right and left front wheels 10 are steered at the set angle or more, and the like.

In the work automatic control processing, the automatic traveling controller 23F transmits, to the work equipment controller 23D, a work start command for switching the rotary tilling equipment 3 to a work state based on arrival of the tractor 1 at each work start position included in the target route P, a work end command for switching the rotary tilling equipment 3 to a non-work state based on arrival of the tractor 1 at each work stop position included in the target route P, and the like. In response to various control commands, which are transmitted from the automatic traveling controller 23F, regarding the rotary tilling equipment 3, the work equipment controller 23D controls operation of the work clutch unit 19 and the lifting drive unit 20 to execute an automatic work start control of driving the rotary tilling equipment 3 to lower the rotary tilling equipment 3 to a work height, an automatic work end control of lifting the rotary tilling equipment 3 to a non-work height to stop drive of the rotary tilling equipment 3, and the like. With this configuration, a traveling state of the tractor 1 that automatically travels along the target route P can be switched between a work traveling state in which the tractor 1 automatically travels in the work state of the rotary tilling equipment 3 (the state in which the rotary tilling equipment 3 is driven and lowered to the work height) and a non-work traveling state in which the tractor 1 automatically travels in the non-work state of the rotary tilling equipment 3 (the state in which the rotary tilling equipment 3 is lifted to the non-work height and drive thereof is stopped).

That is, the above-described automatic traveling unit 4 includes the power steering unit 17, the brake unit 18, the work clutch unit 19, the lifting drive unit 20, the rolling unit 21, the vehicle state detection instrument 22, the in-vehicle control unit 23, the positioning unit 42, the communication modules 46, 48, and the like. When these components operate properly, the tractor 1 can automatically and accurately travel along the target route P, and the rotary tilling equipment 3 can properly perform a tilling work.

As shown in FIGS. 3 and 4, the tractor 1 includes a surrounding situation acquisition system 8 that acquires a surrounding situation of the tractor 1. As shown in FIG. 4, the surrounding situation acquisition system 8 includes an imaging unit 80 that images the periphery of the tractor 1 to acquire image information and an obstacle detection unit 85 that detects an obstacle around the tractor 1. The obstacle detected by the obstacle detection unit 85 includes a person such as a worker who works in the field A, other work vehicles, existing utility pole and tree in the field A, and the like.

As shown in FIGS. 1 and 4, the imaging unit 80 includes a front camera 81 for which a predetermined area ahead of the cabin 13 is set as an imaging area, a rear camera 82 for which a predetermined area behind the cabin 13 is set as an imaging area, and image processing equipment 83 (see FIG. 4) that processes the image information from the front and rear cameras 81, 82. The image processing equipment 83 is built by an electronic control unit in which a microcontroller and the like are integrated, various control programs, and the like. The image processing equipment 83 is connected to the in-vehicle control unit 23 and the like via the CAN such that these components are mutually communicable with each other.

The image processing equipment 83 performs, e.g., an image generation processing of generating a front image and a rear image of the tractor 1 corresponding to the imaging areas of the cameras 81, 82 from the image information sequentially transmitted from the front and rear cameras 81, 82. Then, the image processing equipment 83 performs an image transmission processing of transmitting the generated images to the display controller 23E of the in-vehicle control unit 23. The display controller 23E transmits each image from the image processing equipment 83 to the operation terminal 27 via the CAN, and transmits each image to a display controller 5A of the mobile communication terminal 5 via the communication modules 48, 52.

With this configuration, the front image and the rear image of the tractor 1 generated by the image processing equipment 83 can be displayed on the operation terminal 27 of the tractor 1, the display device 50 of the mobile communication terminal 5, and the like. With these displayed images, the user can easily grasp situations on the front and rear sides of the tractor 1.

As shown in FIGS. 1 and 4, the obstacle detection unit 85 includes a front obstacle sensor 86 for which the front side of the tractor 1 is set as an obstacle detection area, a rear obstacle sensor 87 for which the rear side of the tractor 1 is set as an obstacle detection area, and a lateral obstacle sensor 88 for which both right and left sides of the tractor 1 are set as obstacle detection areas. As the front obstacle sensor 86 and the rear obstacle sensor 87, a LIDAR sensor that uses pulsed near-infrared laser light for obstacle detection is employed. As the lateral obstacle sensor 88, a sonar that uses an ultrasonic wave for obstacle detection is employed.

As shown in FIG. 4, each of the front obstacle sensor 86 and the rear obstacle sensor 87 has a measurer 86A, 87A that measures a distance to a distance measurement point (a measurement target) within a measurement area by means of near-infrared laser light and a controller 86B, 87B that generates, e.g., a distance image based on measurement information from the measurer 86A, 87A. The lateral obstacle sensor 88 includes a right ultrasonic sensor 88A and a left ultrasonic sensor 88B that transmit and receive an ultrasonic wave and a single controller 88C that measures the distance to the measurement target within the measurement area based on transmission and reception of the ultrasonic wave by the ultrasonic sensors 88A, 88B.

Each of the controllers 86B, 87B, 88C of the obstacle sensors 86 to 88 is built by an electronic control unit in which a microcontroller and the like are integrated, various control programs, and the like. Each of the controllers 86B, 87B, 88C is connected to the in-vehicle control unit 23 and the like via the CAN such that these components are mutually communicable with each other.

Based on the positioning information from the positioning unit 42, detection information transmitted to the in-vehicle control unit 23 from each of the obstacle sensors 86 to 88, and the like, the automatic traveling controller 23F performs a collision avoidance control of avoiding collision with the obstacle by controlling traveling of the tractor 1. In the collision avoidance control, the automatic traveling controller 23F instructs the shift unit controller 23B to execute traveling control for collision avoidance according to the detection information from each of the obstacle sensors 86 to 88 and the like, thereby controlling traveling of the tractor 1 to avoid collision with the obstacle. The automatic traveling controller 23F is one example of a traveling processor of the present invention.

The target route generator 51B executes a target route generation control of generating the target route P based on the vehicle body information including the turning radius of the tractor 1, the work range of the rotary tilling equipment 3, and the like, the field information including the position, shape and the like of the field A where the work is performed using the tractor 1, various types of arbitrary setting information set by the user, and the like. The target route generator 51B is one example of a route generation processor of the present invention.

The vehicle body information includes a first separation distance L1 (see FIGS. 5 to 8) from the installation position, which is measured by the positioning unit 42, of the GNSS antenna 45 on the tractor 1 to the rotary tilling equipment 3 and a second separation distance L2 (see FIGS. 5 to 8) from the rear wheel 11 of the tractor 1 to the rotary tilling equipment 3.

Note that in the present embodiment, the first separation distance L1 is set to a distance from the installation position of the GNSS antenna 45 on the tractor 1 to the rotation center position X1 of a tilling claw 3A of the rotary tilling equipment 3 rotary tilling device 3, as shown in FIG. 1. The second separation distance L2 is set to a distance from the axle center X2 of the rear wheel 11 of the tractor 1 to the rotation center position X1 of the tilling claw 3A.

The field information includes, for specifying the shape, size and the like of the field A, a plurality of shape specifying points (shape specifying coordinates) Cp1 to Cp4 (see FIG. 5) on the field A acquired using the GNSS when the tractor 1 travels along an outer peripheral edge of the field A and a shape specifying line SL (see FIG. 5) connecting these shape specifying points to specify the shape, size and the like of the field A.

Figure 5:
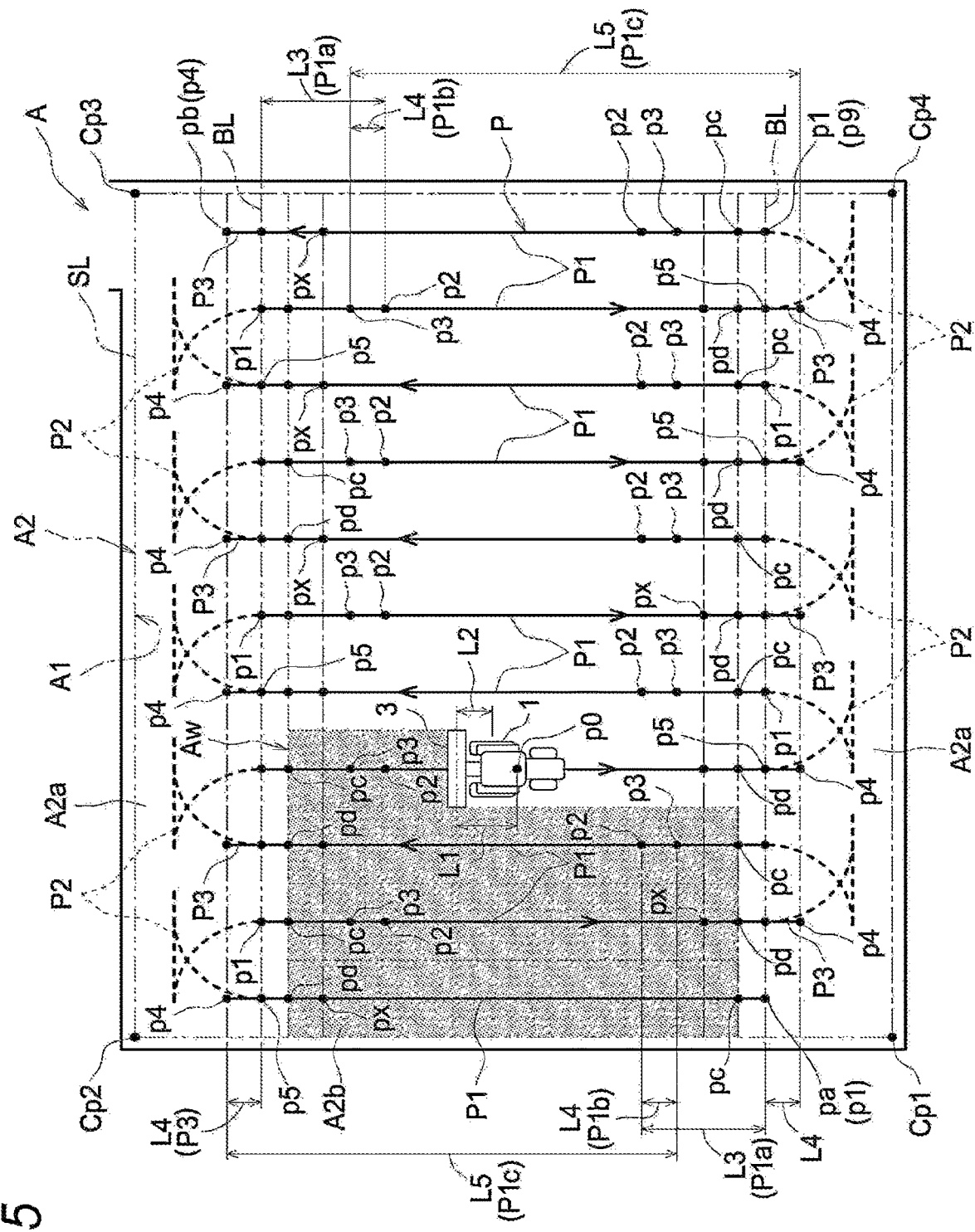
FIG. 5 is a plan view showing one example of a target route according to the embodiment of the present invention.
Figure 6:
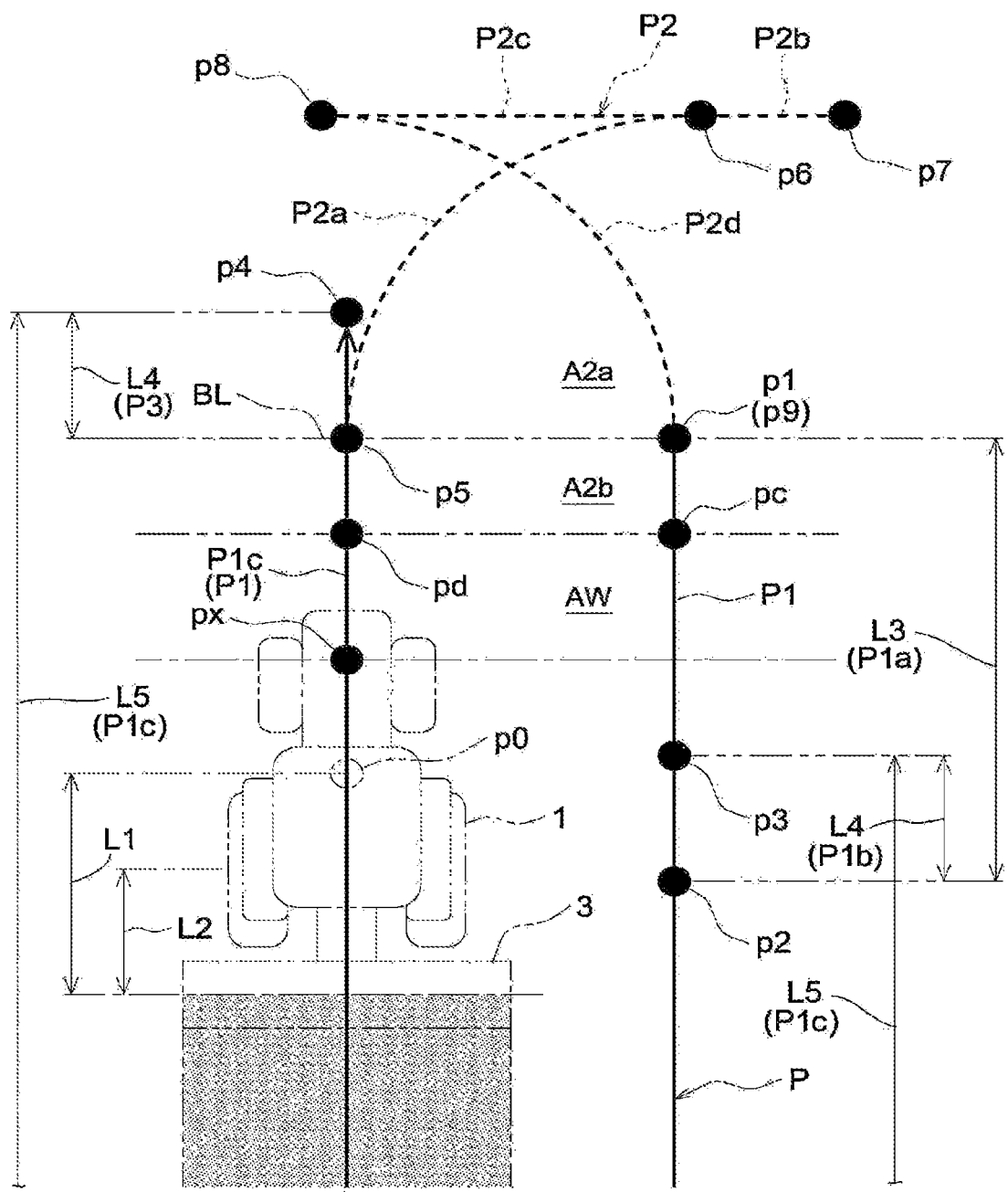
FIG. 6 is an enlarged view showing the target route in a state in which a work vehicle according to the embodiment of the present invention moves forward on a work route in a work traveling state.

Note that in the present embodiment, since the rectangular field A is described as an example of the field A, four corner points Cp1 to Cp4 are acquired as the plurality of shape specifying points, and a rectangular shape specifying line SL connecting these corner points Cp1 to Cp4 is generated, as shown in FIG. 5.

Hereinafter, the control operation of the target route generator 51B in the target route generation control will be described with reference to the target route P shown in FIGS. 5 to 15 and flowcharts shown in FIGS. 16 to 18.

Note that the target route generation control will be described on the assumption that, for example, the start position pa and the end position pb in automatic traveling, a work traveling direction of the tractor 1 and the like have already been manually input by the user as various types of arbitrary setting information.

Figure 16:
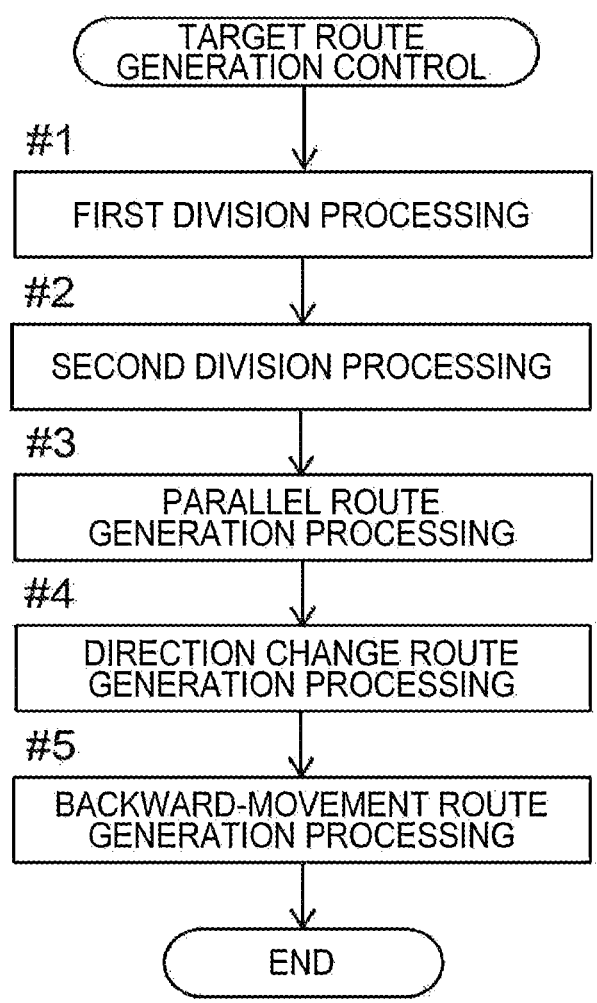
FIG. 16 is a flowchart showing control operation of a target route generator in target route generation control according to the embodiment of the present invention.

For example, as shown in the flowchart of FIG. 16, on the rectangular field A shown in FIG. 5, in a case where the start position pa and the end position pb in automatic traveling are set to positions shown in FIG. 5 and the work traveling direction of the tractor 1 is set to a direction along the short side of the field A, the target route generator 51B first performs a first division processing of dividing the field A into a margin area A1 adjacent to the outer peripheral edge of the field A and a workable area A2 positioned inside the margin area A1 based on the four corner points Cp1 to Cp4 and the rectangular shape specifying line SL as described above (Step #1).

Note that the margin area A1 is an area ensured between the outer peripheral edge of the field A and the workable area A2 in order to prevent, e.g., the rotary tilling equipment 3 from coming into contact with other objects such as a ridge or a fence adjacent to the field A when the tractor 1 automatically travels along an end of the workable area A2.

Based on the turning radius of the tractor 1, the work range of the rotary tilling equipment 3, and the like, the target route generator 51B performs a second division processing of dividing the workable area A2 into a pair of direction change areas A2a set to the long-side ends of the workable area A2 and a reciprocation area A2b set to between the pair of direction change areas A2a (Step #2).

Note that in FIGS. 5 to 15, a boundary line BL indicating a boundary between the direction change area A2a and the reciprocation area A2b is shown in order to easily grasp the direction change area A2a and the reciprocation area A2b.

The target route generator 51B performs a parallel route generation processing of generating, on the reciprocation area A2b, a plurality of parallel routes P1 arranged in parallel at predetermined intervals according to the work range in the direction along the long side of the field A (Step #3).

The target route generator 51B performs, on each direction change area A2a, a direction change route generation processing of generating a plurality of direction change routes P2 for changing the direction of the tractor 1 with the rotary tilling equipment 3 switched to the work state (Step #4).

Note that various types of arbitrary setting information as described above include the type of direction change route P2, and in the present embodiment, a case where a switchback turning route for causing the tractor 1 to change its direction in a fishtail shape by switchback is selected as the direction change route P2 is described as an example as shown in FIGS. 5 to 15.

In addition to the switchback turning route, e.g., a U-shaped turning route for causing the tractor 1 to change its direction in a U-shape can be selected as the direction change route P2.

Figure 17:
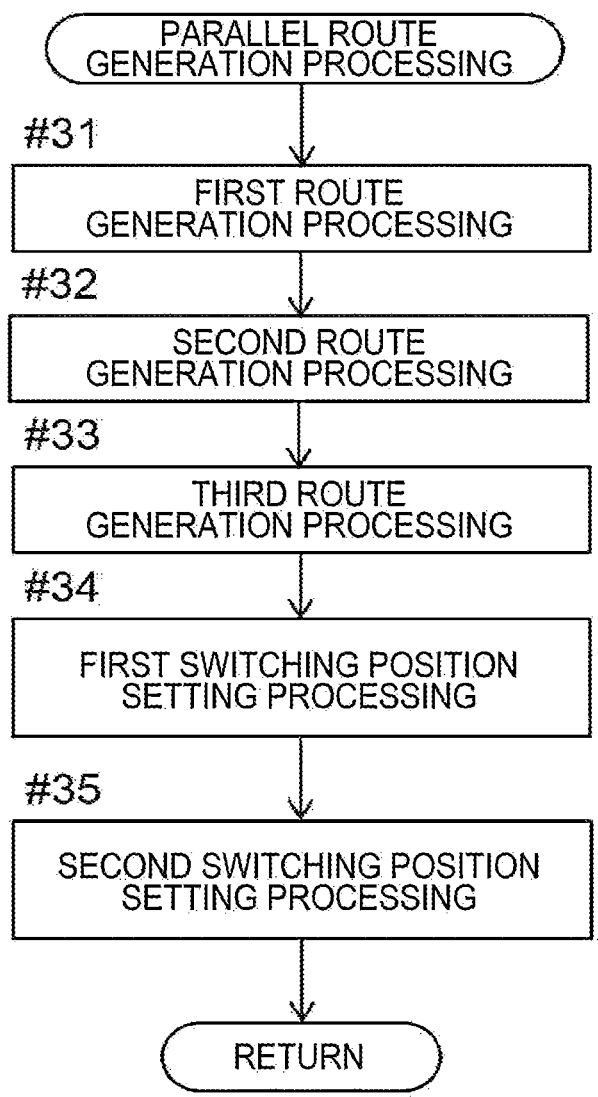
FIG. 17 is a flowchart showing the control operation of the target route generator in parallel route generation processing according to the embodiment of the present invention.

In the parallel route generation processing, the target route generator 51B performs a first route generation processing of generating a first forward-movement route P1a extending from a start position p1 of each parallel route P1 to a first relay position p2 of the parallel route P1 with a first predetermined distance L3 therebetween in a forward-movement direction of the tractor 1 (Step #31), as shown in the flowchart of FIG. 17.

The target route generator 51B performs a second route generation processing of generating a backward-movement route P1b extending from the first relay position p2 to a second relay position p3 of the parallel route P1 with a predetermined length L4 therebetween in a backward-movement direction of the tractor 1 (Step #32).

The target route generator 51B performs a third route generation processing of generating a second forward-movement route P1c extending from the second relay position p3 to an end position p4 of the parallel route P1 (Step #33). In the third route generation processing, the target route generator 51B extends the start side of the second forward-movement route P1c by the predetermined length L4 from the first relay position p2 to the second relay position p3 and extends the end side of the second forward-movement route P1c by the predetermined length L4 from the boundary between the direction change area A2a and the reciprocation area A2b, and sets the total length of the second forward-movement route P1c to a length having such a second predetermined distance L5 that the end side of the second forward-movement route P1c enters the direction change area A2a by the predetermined length L4 from the second relay position p3 beyond the boundary between the direction change area A2a and the reciprocation area A2b.

The target route generator 51B performs a first switching position setting processing of setting the first relay position p2 to a first switching position at which the route on which the tractor 1 travels is switched from the first forward-movement route P1a to the backward-movement route P1b along with arrival of the tractor 1 at the first relay position p2 (Step #34).

The target route generator 51B performs a second switching position setting processing of setting the second relay position p3 to a second switching position at which the route on which the tractor 1 travels is switched from the backward-movement route P1b to the second forward-movement route P1c along with arrival of the tractor 1 at the second relay position p3 (Step #35).

Figure 18:
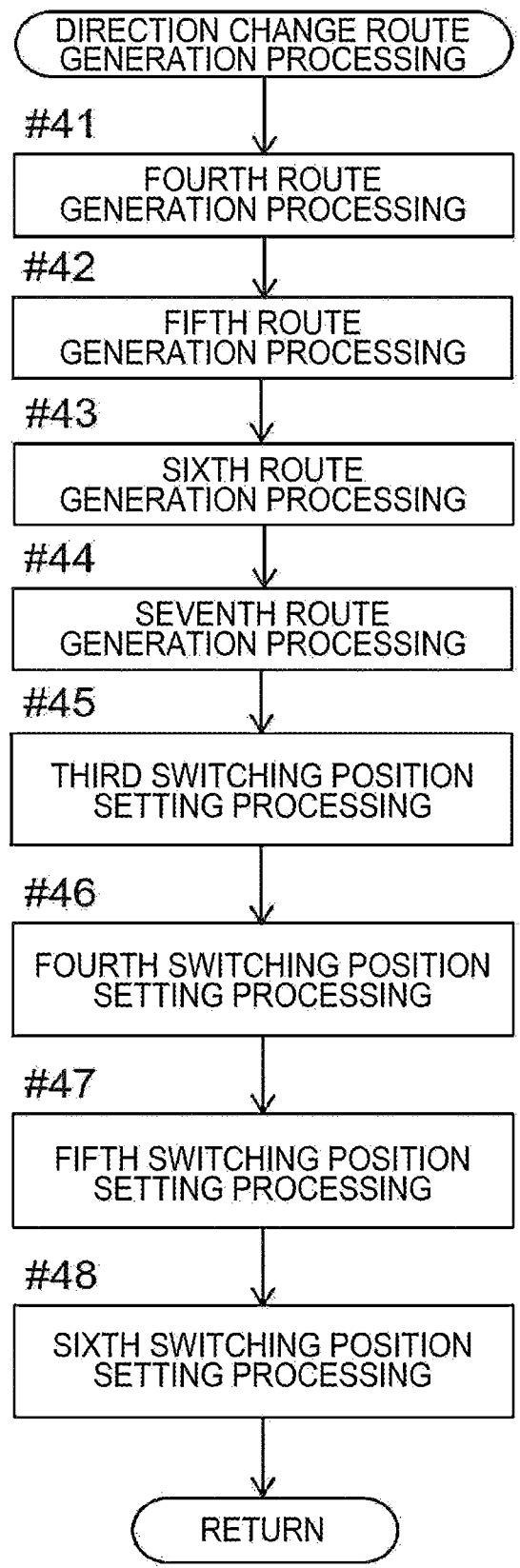
FIG. 18 is a flowchart showing the control operation of the target route generator in direction change route generation processing according to the embodiment of the present invention.

In the direction change route generation processing, the target route generator 51B performs a fourth route generation processing of generating a start-side turning route P2a on which the tractor 1 turns 90 degrees to the right from a start position p5 of the direction change route P2 while moving forward (Step #41), as shown in the flowchart of FIG. 18.

The target route generator 51B performs a fifth route generation processing of generating a right forward-movement route P2b on which the tractor 1 moves forward to the right from an end position p6 of the start-side turning route P2a (Step #42).

The target route generator 51B performs a sixth route generation processing of generating a left backward-movement route P2c on which the tractor 1 moves backward to the left from an end position p7 of the right forward-movement route P2b (Step #43).

The target route generator 51B performs a seventh route generation processing of generating an end-side turning route P2*d* on which the tractor 1 turns 90 degrees to the right from an end position p8 of the left backward-movement route P2*c* while moving forward (Step #44).

The target route generator 51B performs a third switching position setting processing of setting the end position p6 of the start-side turning route P2*a* to a third switching position at which the route on which the tractor 1 travels is switched from the start-side turning route P2*a* to the right forward-movement route P2*b* along with arrival of the tractor 1 at the end position p6 (Step #45).

The target route generator 51B performs a fourth switching position setting processing of setting the end position p7 of the right forward-movement route P2*b* to a fourth switching position at which the route on which the tractor 1 travels is switched from the right forward-movement route P2*b* to the left backward-movement route P2*c* along with arrival of the tractor 1 at the end position p7 (Step #46).

The target route generator 51B performs a fifth switching position setting processing of setting the end position p8 of the left backward-movement route P2*c* to a fifth switching position at which the route on which the tractor 1 travels is switched from the left backward-movement route P2*c* to the end-side turning route P2*d* along with arrival of the tractor 1 at the end position p8 (Step #47).

The target route generator 51B performs a sixth switching position setting processing of setting an end position p9 of the end-side turning route P2*d* to a sixth switching position at which the route on which the tractor 1 travels is switched from the end-side turning route P2*d* to the first forward-movement route P1*a* of the parallel route P1 along with arrival of the tractor 1 at the end position p9 (Step #48).

After the parallel route generation processing and the direction change route generation processing, the target route generator 51B performs a backward-movement route generation processing of generating a relay backward-movement route P3 on which the tractor 1 moves backward from the end position p4 of the parallel route P1 to the start position p5 of the direction change route P2 (Step #5), as shown in the flowchart of FIG. 16.

In this manner, the target route generator 51B generates the target route P suitable for the tractor 1 to perform the tilling work on the field A while automatically traveling.

Figure 12:
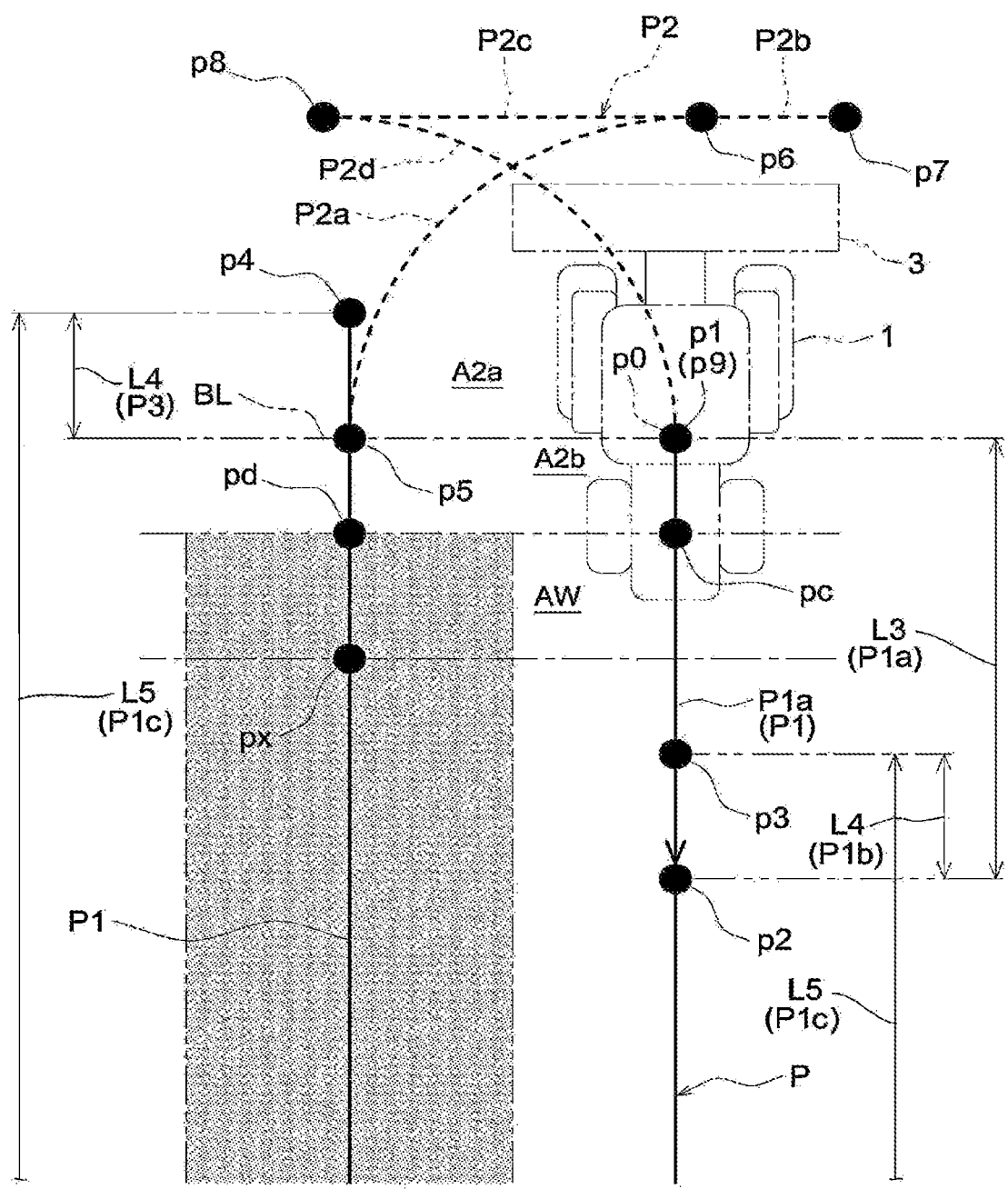
FIG. 12 is an enlarged view showing the target route in a state in which the work vehicle according to the embodiment of the present invention has reached an end position of an end-side turning route after having moved forward on the end-side turning route in the non-work traveling state.
Figure 13:
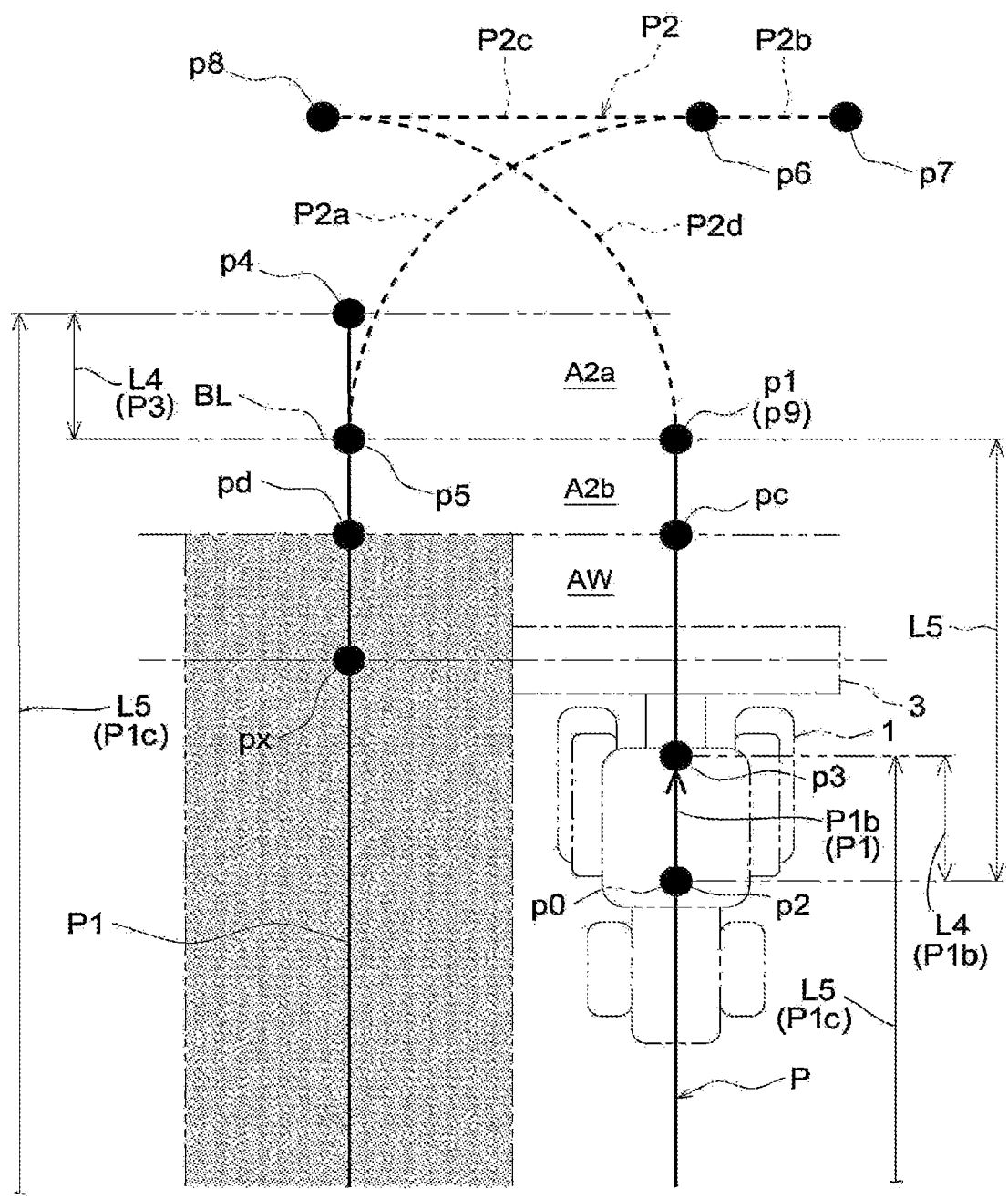
FIG. 13 is an enlarged view showing the target route in a state in which the work vehicle according to the embodiment of the present invention has reached an end position of a non-work route after having moved forward on the non-work route in the non-work traveling state.
Figure 14:
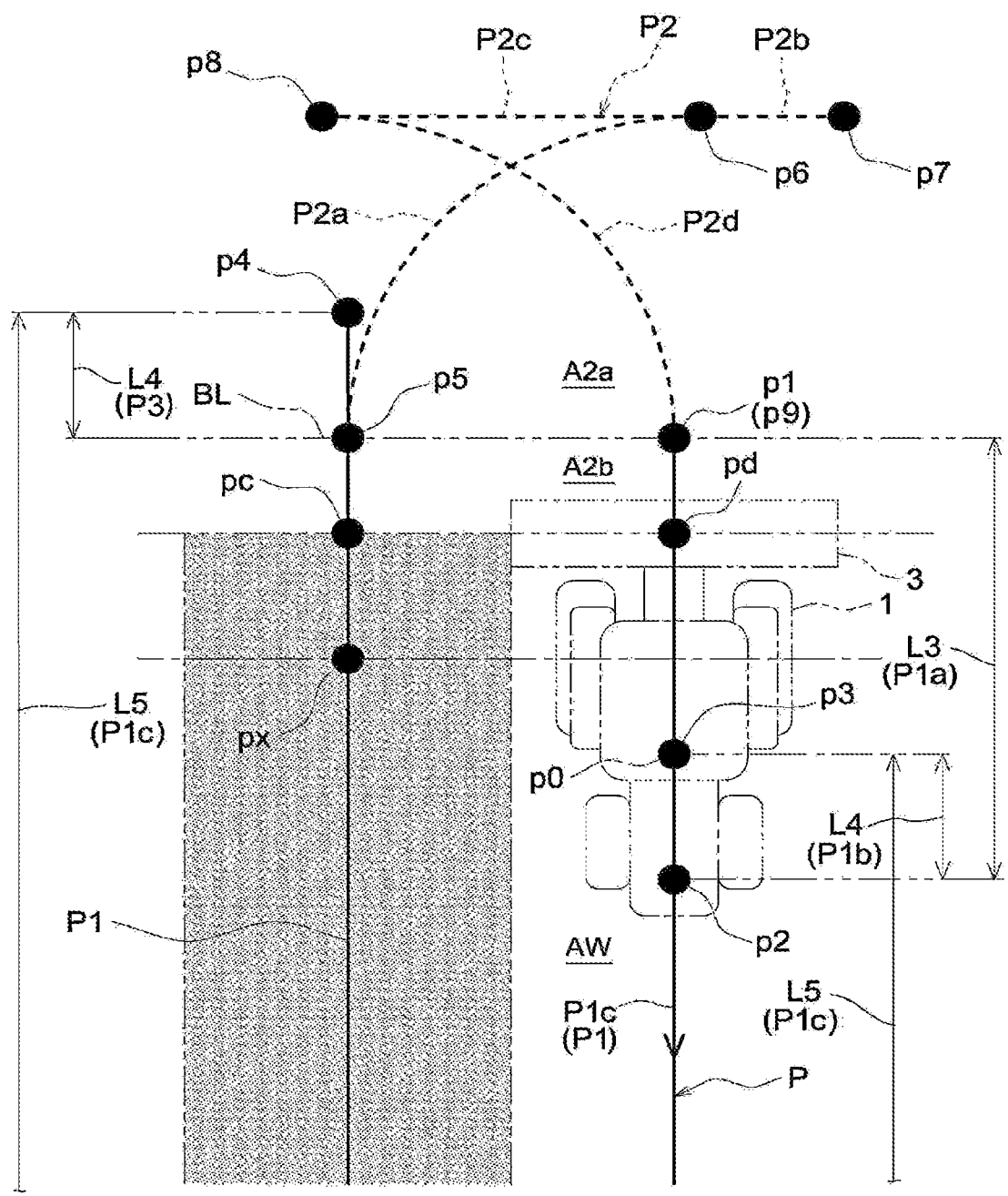
FIG. 14 is an enlarged view showing the target route in a state in which the work vehicle according to the embodiment of the present invention has reached an end position of a second backward-movement route after having moved backward on the second backward-movement route in the non-work traveling state.
Figure 15:
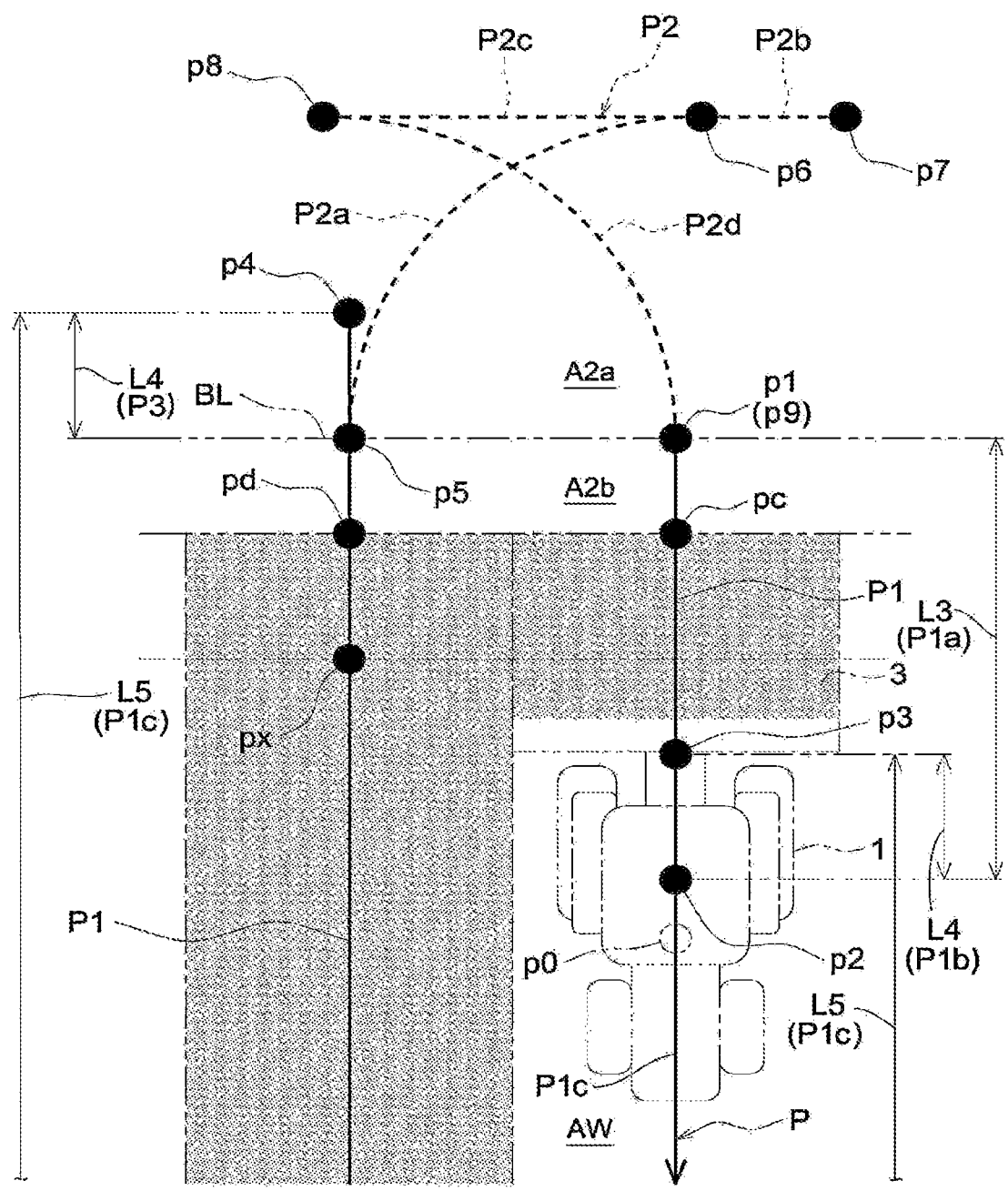
FIG. 15 is an enlarged view showing the target route in a state in which the work vehicle according to the embodiment of the present invention moves forward on the work route in the work traveling state.

In a case where the start of automatic traveling is instructed in a state in which the tractor 1 is positioned at the start position (the start position p1 of the parallel route P1) of the target route P, which is the start position pa in automatic traveling, in a proper posture in which the tractor 1 can automatically travel according to the target route P, the automatic traveling controller 23F first moves the tractor 1 forward along the first forward-movement route P1*a* of the parallel route P1 in the non-work traveling state in which the rotary tilling equipment 3 is switched to the non-work state (see FIGS. 12 and 13).

When the tractor 1 reaches the first relay position p2 which is the end position of the first forward-movement route P1*a*, the automatic traveling controller 23F switches the tractor 1 from a forward-movement state to a backward-movement state via the shift unit controller 23B based on the fact that the traveling route is switched from the first forward-movement route P1*a* to the backward-movement route P1*b* along with arrival of the tractor 1. Accordingly, the tractor 1 moves backward along the backward-movement route P1*b* in the non-work traveling state (see FIGS. 13 and 14).

When the tractor 1 reaches the second relay position p3 which is the end position of the backward-movement route P1*b*, the automatic traveling controller 23F switches the tractor 1 from the backward-movement state to the forward-movement state via the shift unit controller 23B and switches the rotary tilling equipment 3 from the non-work state to the work state based on the fact that the traveling route is switched from the backward-movement route P1*b* to the second forward-movement route P1*c* along with arrival of the tractor 1. Accordingly, the tractor 1 moves forward along the second forward-movement route P1*c* in the work traveling state in which the rotary tilling equipment 3 is switched to the work state (See FIGS. 14, 15, and 6).

When the tractor 1 reaches the end position p4 of the parallel route P1 which is the end position of the second forward-movement route P1*c*, the automatic traveling controller 23F switches the tractor 1 from the forward-movement state to the backward-movement state via the shift unit controller 23B and switches the rotary tilling equipment 3 from the work state to the non-work state based on the fact that the traveling route is switched from the second forward-movement route P1*c* to the relay backward-movement route P3 along with arrival of the tractor 1. Accordingly, the tractor 1 moves backward along the relay backward-movement route P3 in the non-work traveling state (see FIGS. 7 and 8).

When the tractor 1 reaches the start position p5 of the direction change route P2 which is the end position of the relay backward-movement route P3, the automatic traveling controller 23F switches the tractor 1 from the backward-movement state to the forward-movement state via the shift unit controller 23B based on the fact that the traveling route is switched from the relay backward-movement route P3 to the start-side turning route P2*a* of the direction change route P2 along with arrival of the tractor 1. Accordingly, the tractor 1 moves forward along the start-side turning route P2*a* in the non-work traveling state (see FIGS. 8 and 9).

Figure 9:
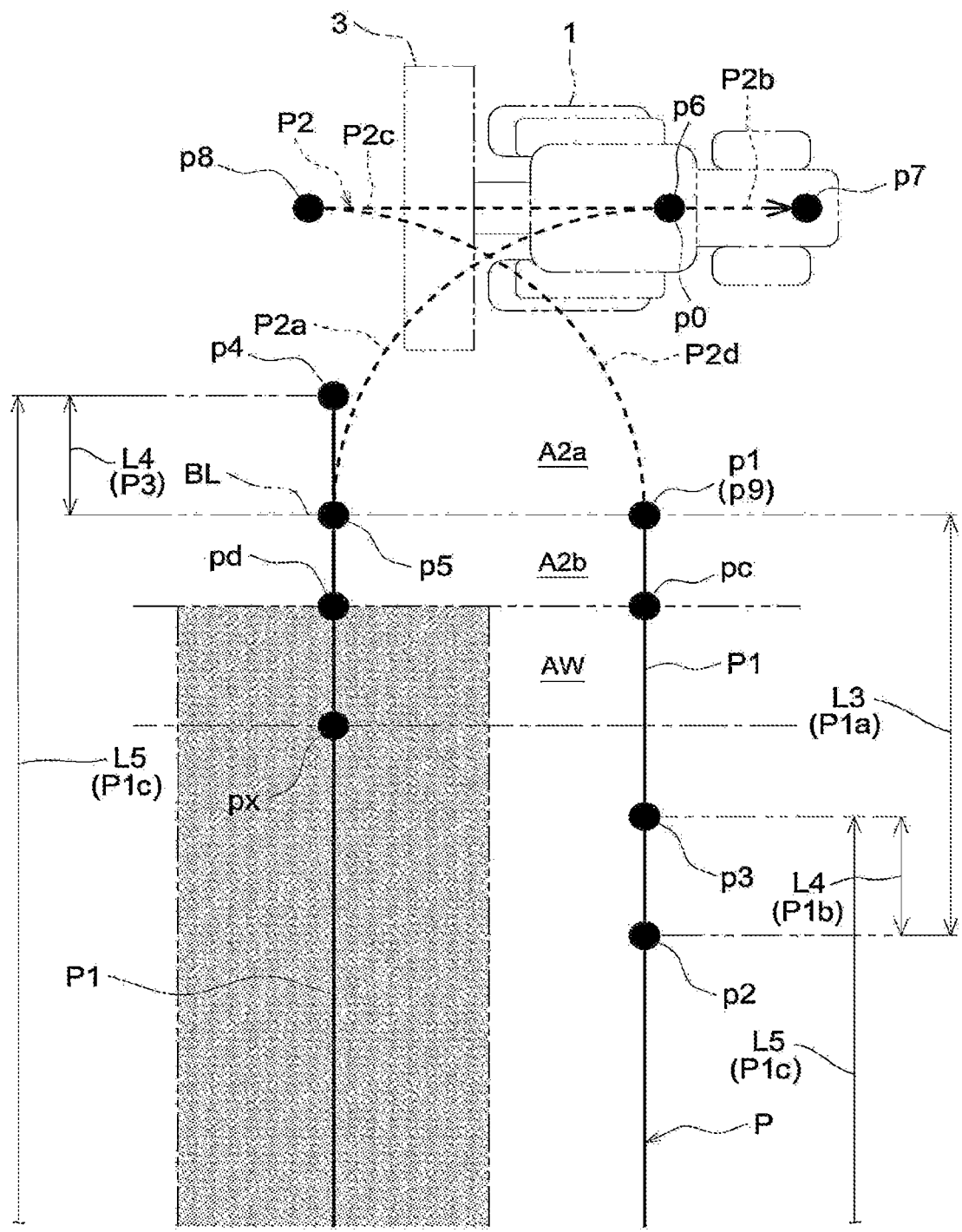
FIG. 9 is an enlarged view showing the target route in a state in which the work vehicle according to the embodiment of the present invention has reached an end position of the start-side turning route after having moved forward on the start-side turning route in the non-work traveling state.
Figure 10:
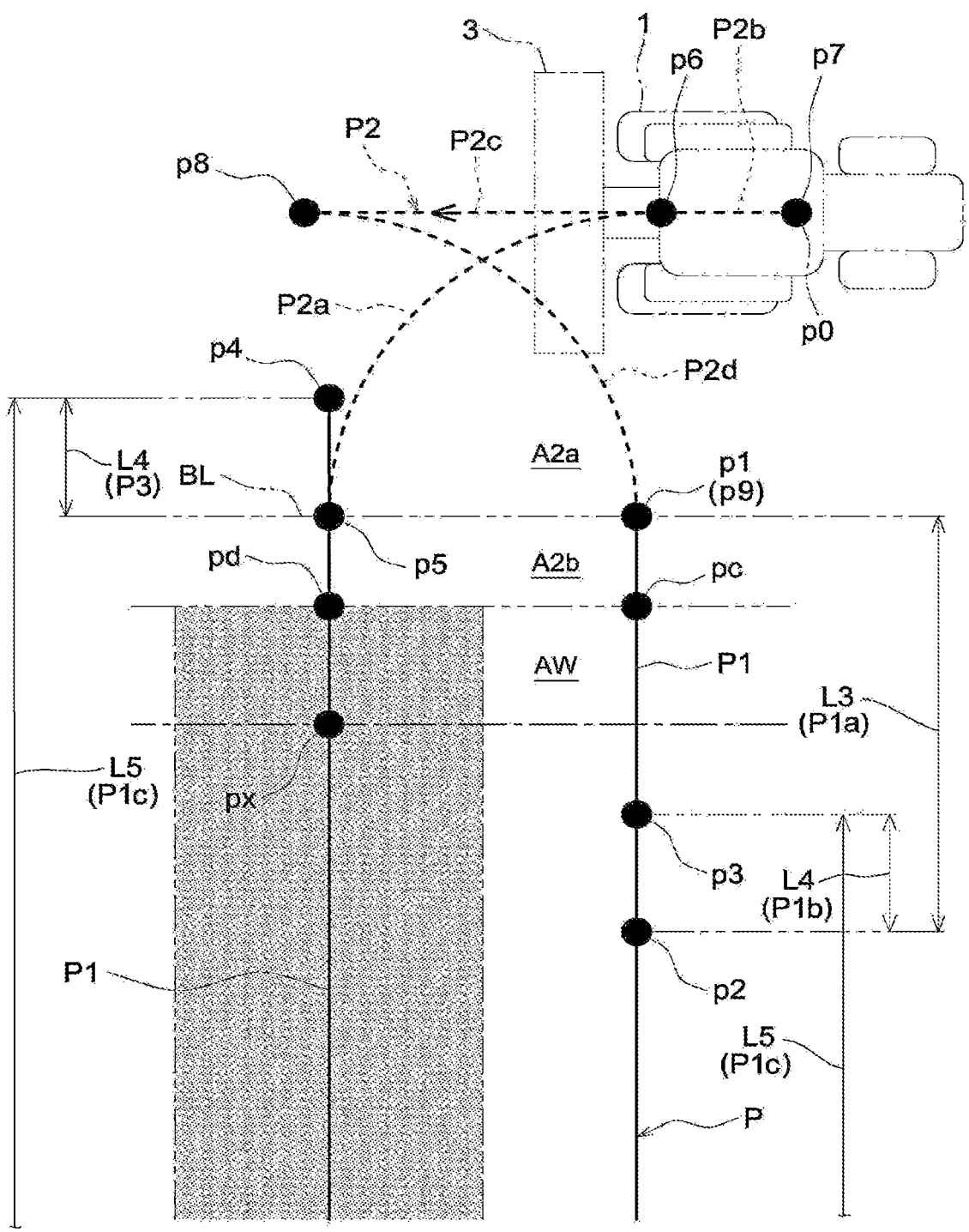
FIG. 10 is an enlarged view showing the target route in a state in which the work vehicle according to the embodiment of the present invention has reached an end position of a right forward-movement route after having moved forward on the right forward-movement route in the non-work traveling state.
Figure 11:
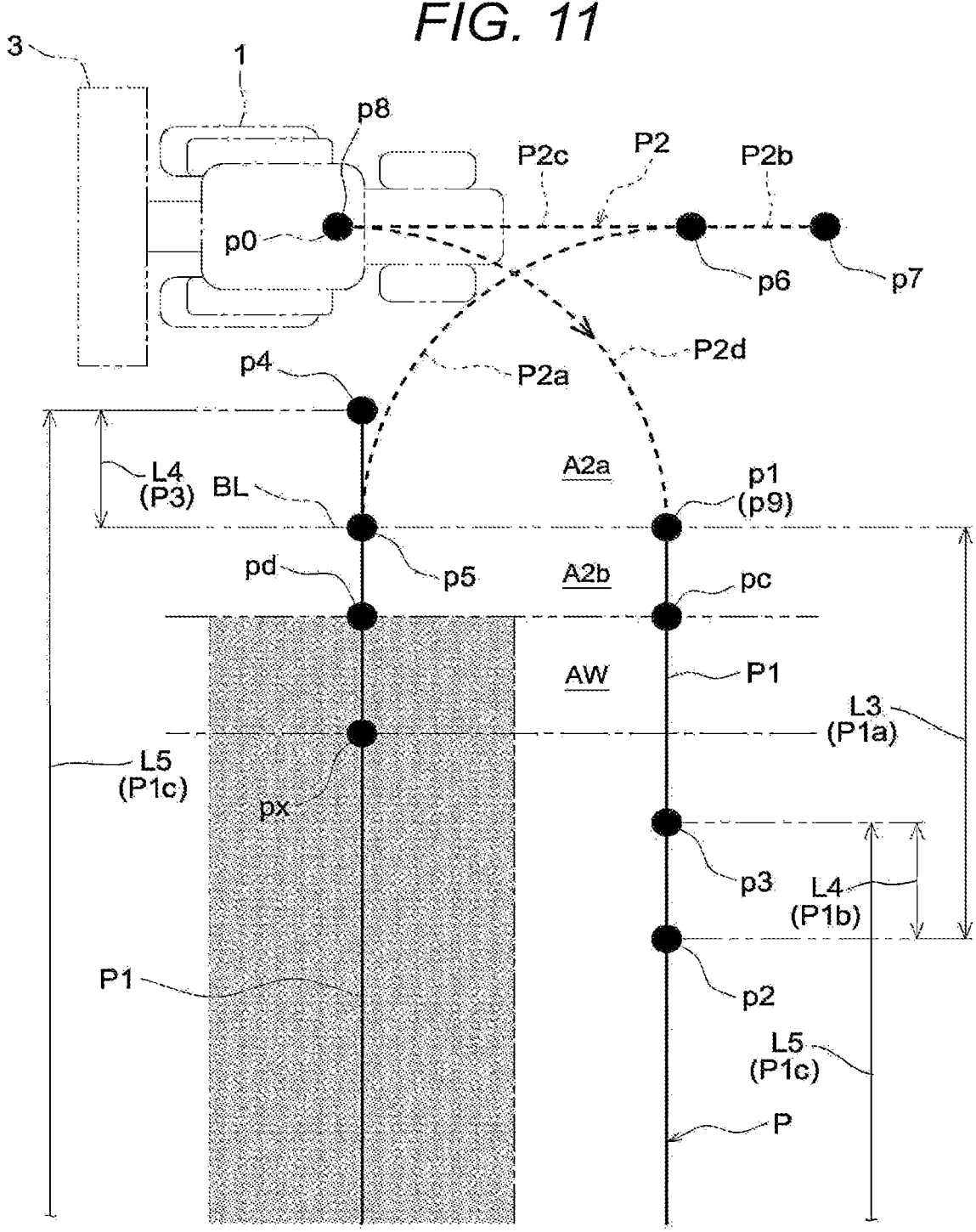
FIG. 11 is an enlarged view showing the target route in a state in which the work vehicle according to the embodiment of the present invention has reached an end position of a left backward-movement route after having moved backward on the left backward-movement route in the non-work traveling state.

When the tractor 1 reaches the end position p6 of the start-side turning route P2*a*, the automatic traveling controller 23F causes the tractor 1 to move forward along the right forward-movement route P2*b* based on the fact that the traveling route is switched from the start-side turning route P2*a* to the right forward-movement route P2*b* along with arrival of the tractor 1 (see FIGS. 9 and 10).

When the tractor 1 reaches the end position p7 of the right forward-movement route P2*b*, the automatic traveling controller 23F switches the tractor 1 from the forward-movement state to the backward-movement state via the shift unit controller 23B based on the fact that the traveling route is switched from the right forward-movement route P2*b* to the left backward-movement route P2*c* along with arrival of the tractor 1. Accordingly, the tractor 1 moves backward along the left backward-movement route P2*c* in the non-work traveling state (see FIGS. 10 and 11).

When the tractor 1 reaches the end position p8 of the left backward-movement route P2*c*, the automatic traveling controller 23F switches the tractor 1 from the backward-movement state to the forward-movement state via the shift unit controller 23B based on the fact that the traveling route is switched from the left backward-movement route P2*c* to the end-side turning route P2*d* along with arrival of the tractor 1. Accordingly, the tractor 1 moves forward along the end-side turning route P2*d* in the non-work traveling state (see FIGS. 11 and 12).

When the tractor 1 reaches the end position p9 of the end-side turning route P2*d*, the automatic traveling controller 23F causes the tractor 1 to move forward along the first forward-movement route P1a in the non-work traveling state based on the fact that the traveling route is switched from the end-side turning route P2d to the first forward-movement route P1a of the parallel route P1 along with arrival of the tractor 1 (see FIGS. 12 and 13).

That is, on the target route P, the second forward-movement route P1c of each parallel route P1 functions as the work route on which the tractor 1 moves forward with the rotary tilling equipment 3 switched to the work state. The target route P is generated with such a route setting that the second forward-movement routes (work routes) P1c of the plurality of parallel routes P1 arranged in parallel at the predetermined intervals according to the work range are connected in the order of traveling of the tractor 1 via the plurality of relay backward-movement routes P3, the plurality of direction change routes P2, and the first forward-movement routes P1a and the backward-movement routes P1b of the plurality of parallel routes P1.

In addition, on the target route P, the second forward-movement route P1c is generated with such a length that the end side thereof is extended by the predetermined length L4 and enters the direction change route P2 side by the predetermined length L4. The relay backward-movement route P3 on which the tractor 1 moves backward from the end position p4 of the extended second forward-movement route P1c to the start position p5 of the direction change route is generated.

With this configuration, when the tractor 1 automatically travels along the target route P, the rotary tilling equipment 3 can be maintained in the work state until the tractor 1 reaches the end position p4 of the extended second forward-movement route P1c beyond the start position p5 of the direction change route P2. Accordingly, as compared to a case where the end position p4 of the second forward-movement route P1c is set as the start position p5 of the direction change route P2, a work end position pd, which is the grounding position of the rotary tilling equipment 3 when the tractor 1 reaches the end position p4 of the second forward-movement route P1c, can be closer to the start position p5 of the direction change route P2.

As a result, on each second forward-movement route P1c, a non-work route of the tractor 1 between the work end position pd and the start position p5 of the direction change route P2 can be shortened by the predetermined length L4 by which the second forward-movement route P1c is extended. Accordingly, the work area where the tractor 1 works while automatically traveling can be expanded, and the work efficiency in a case where the tractor 1 works while automatically traveling can be improved.

Note that in FIGS. 5 to 15, the position of the rotary tilling equipment 3 when the tractor 1 reaches the start position p5 of the direction change route P2 is indicated by a reference character px, and it is shown that a grounding position pd of the rotary tilling equipment 3 when the tractor 1 reaches the end position p4 of the second forward-movement route P1c and ends traveling for the work is closer to the start position p5 of the direction change route P2 than the position px of the rotary tilling equipment 3 when the tractor 1 reaches the start position p5 of the direction change route P2 is to the start position p5.

Since the tractor 1 moves backward from the end position p4 of the second forward-movement route P1c to the start position p5 of the direction change route P2 in the non-work traveling state along the relay backward-movement route P3 until the tractor 1 changes its direction along the direction change route P2 after having reached the end position p4 of the second forward-movement route P1c, the tractor 1 can properly change its direction toward the start position p1 of the next parallel route P1 along the direction change route P2 while the position and size of the direction change area where the tractor 1 changes its direction are the same as those before the end side of the second forward-movement route P1c is extended.

Thus, the above-described non-work route can be shortened without changing the position and size of the direction change area A2a where the tractor 1 changes its direction, and the work efficiency when the tractor 1 works while automatically traveling can be improved.

On the target route P, the predetermined length L4 by which the end side of the second forward-movement route P1c is extended is set to the length based on the second separation distance L2 from the rear wheel 11 of the tractor 1 to the rotary tilling equipment 3. Specifically, the predetermined length L4 is set to a length shorter than the second separation distance L2 from the axle center X2 of the rear wheel 11 of the tractor 1 to the rotation center position X1 of the tilling claw 3A of the rotary tilling equipment 3.

With this configuration, when the tractor 1 moves backward from the end position p4 of the second forward-movement route P1c to the start position p5 of the direction change route P2 in the non-work traveling state along the relay backward-movement route P3, a possibility of the rear wheel 11 of the tractor 1 moving into an area where the work has been done by the rotary tilling equipment 3 can be avoided.

Thus, while a probability of the rear wheel 11 of the tractor 1 moving into the area where the work has been done is avoided, the above-described non-work route can be shortened, and the work efficiency in a case where the tractor 1 works while automatically traveling can be improved.

On the target route P, the start position (the second relay position p3) of the second forward-movement route P1c is set to a position closer to the start position p1 of the parallel route P1 by the predetermined length L4 than the first relay position p2 separated by the first predetermined distance L3 from the start position p1 of each parallel route P1 such that the work start position pc, which is the grounding position of the rotary tilling equipment 3 when the tractor 1 of which the direction has been changed reaches the second relay position p3, which is the start position of the second forward-movement route P1c, coincides with the work end position pd, which is the grounding position of the rotary tilling equipment 3 when the tractor 1 reaches the end position p4 of the extended second forward-movement route P1c.

With this configuration, the grounding position (the work start position) pc of the rotary tilling equipment 3 when the tractor 1 reaches the start position p3 of the second forward-movement route P1c and starts working while automatically traveling can be aligned with the grounding position (the work end position) pd of the rotary tilling equipment 3 when the tractor 1 reaches the end position p6 of the second forward-movement route P1c and ends working while automatically traveling.

Accordingly, as in the end side of the second forward-movement route P1c, the grounding position (the work start position) pc of the rotary tilling equipment 3 when the tractor 1 reaches the start position p3 of the second forward-movement route P1c can be closer to the end position p9 of the direction change route P2.

Thus, the non-work route between the end position p9 of each direction change route P2 and the work start position pc of the tractor 1 can be shortened, the work efficiency when the tractor 1 works while automatically traveling can be improved, and work accuracy when the tractor 1 works while automatically traveling can be improved.

The target route P includes the first forward-movement route P1a extending from the end position p9 of the direction change route P2 to the start position p3 of the second forward-movement route P1c and the backward-movement route P1b on which the tractor 1 moves backward from the first relay position p2 which is the end position of the first forward-movement route P1a to the start position p3 of the second forward-movement route P1c.

With this configuration, when the tractor 1 moves from the end position p9 of the direction change route P2 to the start position p3 of the second forward-movement route P1c, if the position or orientation of the tractor 1 deviates from the second forward-movement route P1c beyond an acceptable range, the position or orientation of the tractor 1 with respect to the start position p3 of the second forward-movement route P1c can be corrected to within the acceptable range by forward movement of the tractor 1 along the first forward-movement route P1a and backward movement of the tractor 1 along the backward-movement route P1b.

Accordingly, the position or orientation of the tractor 1 with respect to the second forward-movement route P1c when the tractor 1 reaches the start position p3 of the second forward-movement route P1c and starts working while automatically traveling can be adjusted to a proper position or orientation, and the work accuracy when the tractor 1 works while automatically traveling can be improved.

Various types of arbitrary setting information as described above include the traveling drive mode of the tractor 1 selected by operation of the first selection switch as described above. Thus, in the above-described direction change route generation processing, the target route generator 51B determines the turning radii of the start-side turning route P2a and the end-side turning route P2d according to the arbitrarily-set traveling drive mode of the tractor 1. In a case where any one of the front wheel acceleration mode, the turning brake mode, and the front wheel acceleration turning brake mode is arbitrarily set as the traveling drive mode of the tractor 1, the automatic traveling controller 23F switches the traveling drive mode of the tractor 1 to the arbitrarily-set traveling drive mode when the tractor 1 reaches the start position p5 of the direction change route P2 which is the end position of the relay backward-movement route P3. When the tractor 1 reaches the end position p6 of the start-side turning route P2a, the automatic traveling controller 23F returns the traveling drive mode of the tractor 1 to the original traveling drive mode before switching to the arbitrarily-set traveling drive mode. When the tractor 1 reaches the end position p8 of the left backward-movement route P2c which is the start position of the end-side turning route P2d, the automatic traveling controller 23F switches the traveling drive mode of the tractor 1 to the arbitrarily-set traveling drive mode. When the tractor 1 reaches the end position p9 of the end-side turning route P2d, the automatic traveling controller 23F returns the traveling drive mode of the tractor 1 to the original traveling drive mode before switching to the arbitrarily-set traveling drive mode.

With this configuration, in a case where the target route P is generated, if the user arbitrarily sets any one of the front wheel acceleration mode, the turning brake mode, and the front wheel acceleration turning brake mode as the travel driving mode of the tractor 1, the target route generator 51B generates the target route P based on various types of arbitrary setting information including the arbitrarily-set traveling drive mode of the tractor 1. Thus, in a case where the tractor 1 turns along the start-side turning route P2a or the end-side turning route P2d of the target route P, the tractor 1 can travel in any one of the front wheel acceleration mode, the turning inner side braking state, and the front wheel acceleration turning inner side braking state according to the arbitrarily-set traveling drive mode of the tractor 1, and the turning radius of the tractor 1 can be decreased.

That is, in a case where the target route P is generated, if any one of the front wheel acceleration mode, the turning brake mode, and the front wheel acceleration turning brake mode is arbitrarily set as the traveling drive mode of the tractor 1, the target route generator 51B can narrow the pair of direction change areas A2a where the direction change route P2 is generated and expands the reciprocation area A2b where the parallel route P1 is generated in the above-described second division processing. Accordingly, a work area Aw can be expanded, and the work efficiency in a case where the tractor 1 works while automatically traveling can be improved.

Note that the traveling drive mode of the tractor 1 is not necessarily arbitrarily set by the user as described above, but the target route generator 51B may be configured to automatically set an optimal traveling drive mode for expanding the work area Aw and improving the work efficiency.

Note that the target route P shown in FIG. 5 is merely an example, and the target route generator 51B can generate various suitable target routes P based on the vehicle body information different according to the model of tractor 1, the type of work equipment, and the like, the field information, such as the shape and size of the field A, different according to the field A, and the like.

[Vehicle Speed Control Processing]

For example, in a typical automatic traveling system, in a case where a work vehicle (the tractor 1) is switched from forward movement to backward movement in order to change its direction, the work vehicle is sometimes decelerated before a target position, at which forward/backward movement is switched, so as to temporarily stop at the target position. When such deceleration control is performed, a problem that a work efficiency is degraded because it takes time to change the direction is caused. On the other hand, in a case where the deceleration control is not performed, the time required for changing the direction can be shortened, but the work vehicle cannot be stopped at the target position, leading to a problem that the work vehicle travels out of the field (an outer-field area A1) and the automatic traveling thereof is stopped accordingly. As a result, the work efficiency is degraded. The automatic traveling system according to the present invention has the following configurations so that the work efficiency of the work vehicle can be improved by properly changing the direction of the work vehicle.

Figure 19A:
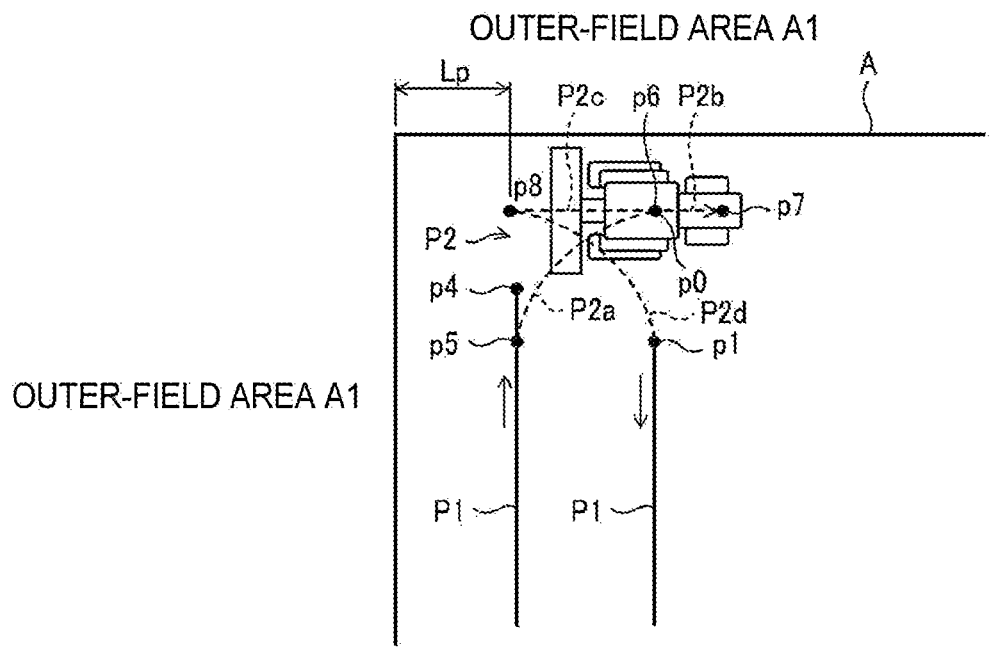
FIG. 19A is a view showing a traveling state in a case where the work vehicle according to the embodiment of the present invention changes its direction at a left end of a field.

The target route generator 51B generates the target route P including the work route P1 on which the tractor 1 moves forward on the field A and the direction change route P2 on which the tractor 1 changes its direction. The target route generator 51B is one example of a route generation processor of the present invention. For example, as shown in FIG. 19A, the target route P includes a plurality of work routes P1 arranged in parallel, and the direction change route P2 on which the tractor 1 changes its direction from one work route P1 to an adjacent work route P1. The direction change route P2 includes the start-side turning route P2a connecting the start position p5 and the end position p6 of the direction change route P2, the right forward-movement route P2b connecting the end position p6 and the end position p7, the left backward-movement route P2c connecting the end position p7 and the end position p8, and the end-side turning route P2*d* connecting the end position p8 and the start position p1 of the work route P1.

The automatic traveling controller 23F causes the tractor 1 to automatically travel along the target route P based on the positioning information from the positioning unit 42. In addition, in a case where the tractor 1 changes its direction along the direction change route P2, if a direction change position at which the front-rear direction of the tractor 1 is changed is within a predetermined distance from the predetermined area in the traveling direction of the tractor 1 immediately before the tractor 1 reaches the direction change position, the automatic traveling controller 23F executes a deceleration processing of decelerating the target speed of the tractor 1 toward the direction change position. The direction change position is a position at which the front-rear direction in which the tractor 1 travels is switched, and for example, is a position at which forward movement is switched to backward movement or a position at which backward movement is switched to forward movement.

On the other hand, the automatic traveling controller 23F does not execute the deceleration processing in a case where the direction change position of the tractor 1 is equal to or more than the predetermined distance from the predetermined area in the traveling direction of the tractor 1 immediately before the tractor 1 reaches the direction change position. The automatic traveling controller 23F is one example of a traveling processor of the present invention.

Here, the predetermined area of the present invention is, for example, an area (the outer-field area A1) outside the field A. Note that the predetermined area is not limited to the outer-field area A1 and may be, for example, an area where the work has been done and overlap traveling of the tractor 1 is prohibited, an obstacle area where an obstacle, an inlet slope and the like are present, and the like. The automatic traveling controller 23F executes the deceleration control such that the tractor 1 does not enter the predetermined area when changing its direction.

For example, the tractor 1 turns 90 degrees to the right from the start position p5 of the direction change route P2 while moving forward, moves forward along the start-side turning route P2*a* until reaching the end position p6, and when having reached the end position p6, moves forward to the right on the right forward-movement route P2*b* until reaching the end position p7 (see FIG. 19A). When reaching the end position p'7, the tractor 1 moves backward to the left on the left backward-movement route P2*c* until reaching the end position p8 (see FIG. 19B). When reaching the end position p8, the tractor 1 turns 90 degrees to the right while moving forward, and moves forward on the end-side turning route P2*d* until reaching the start position p1 of the work route P1 (see FIG. 19C). Note that FIGS. 19A to 19C show, as an example, the work route P1 and the direction change route P2 on the left side of the field A and FIGS. 20A to 20C show the work route P1 and the direction change route P2 on the right side of the field A.

Figure 19B:
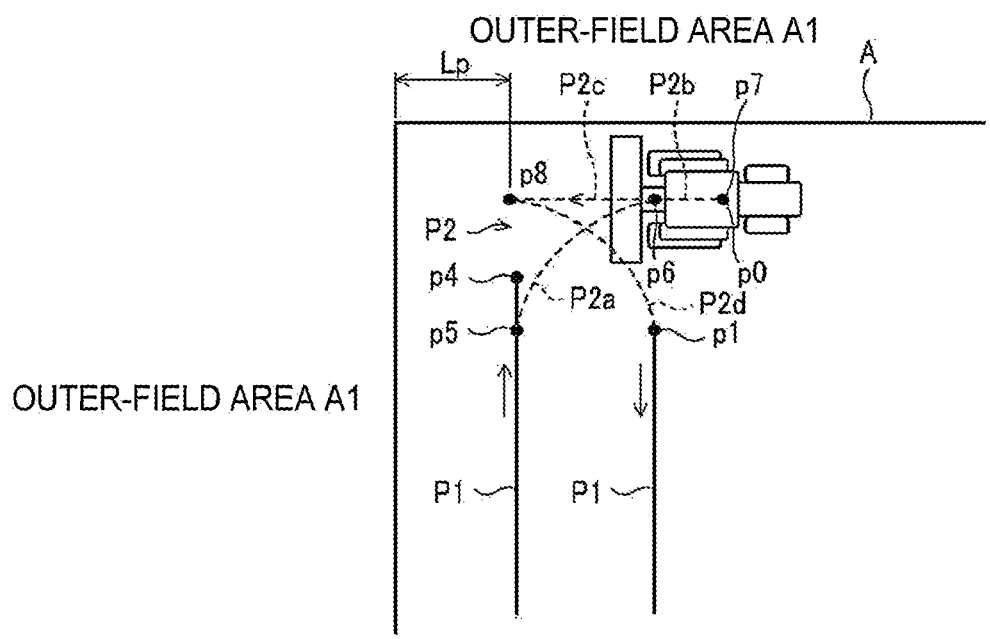
FIG. 19B is a view showing the traveling state in the case where the work vehicle according to the embodiment of the present invention changes its direction at the left end of the field.
Figure 19C:
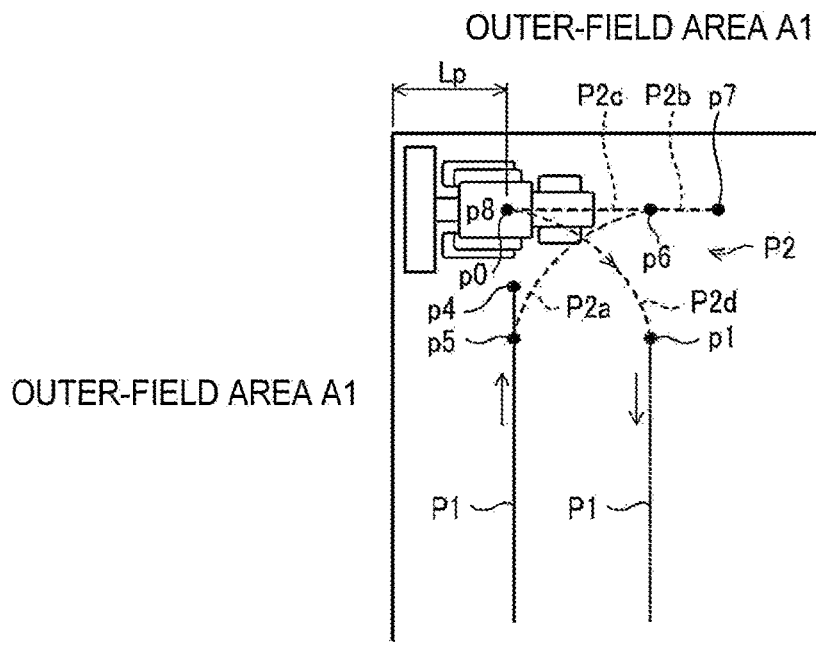
FIG. 19C is a view showing the traveling state in the case where the work vehicle according to the embodiment of the present invention changes its direction at the left end of the field.
Figure 20A:
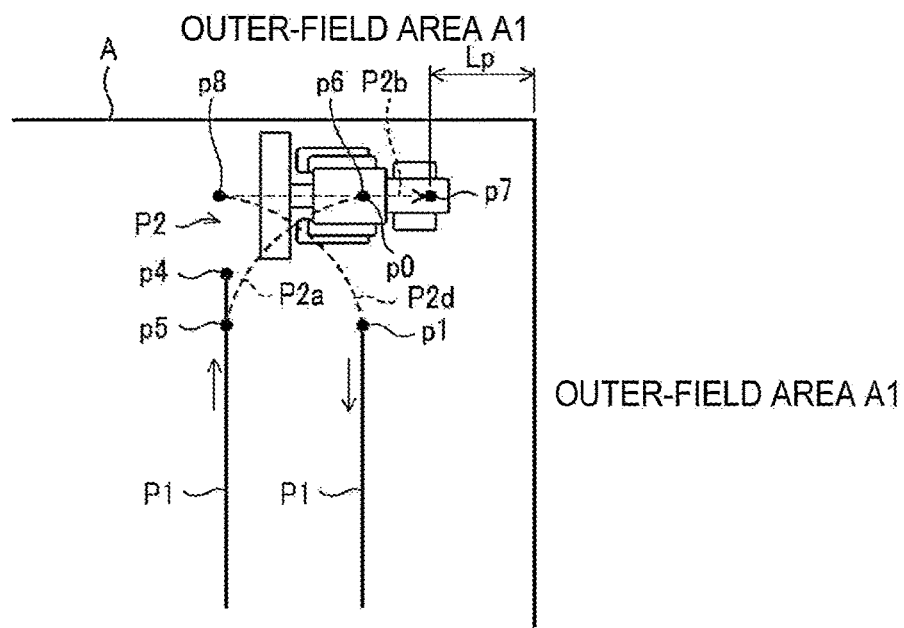
FIG. 20A is a view showing a traveling state in a case where the work vehicle according to the embodiment of the present invention changes its direction at a right end of the field.
Figure 20B:
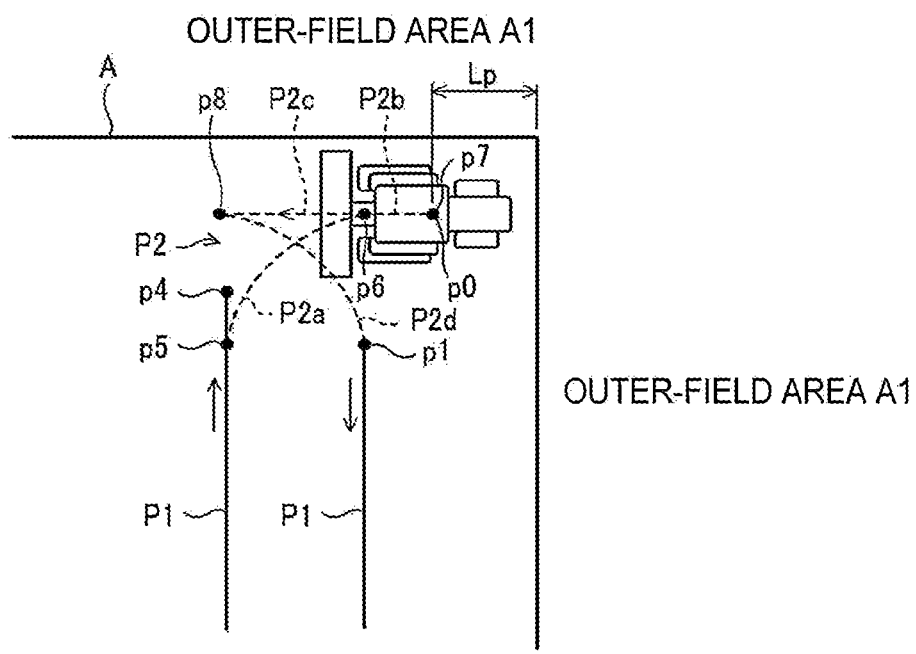
FIG. 20B is a view showing the traveling state in the case where the work vehicle according to the embodiment of the present invention changes its direction at the right end of the field.
Figure 20C:
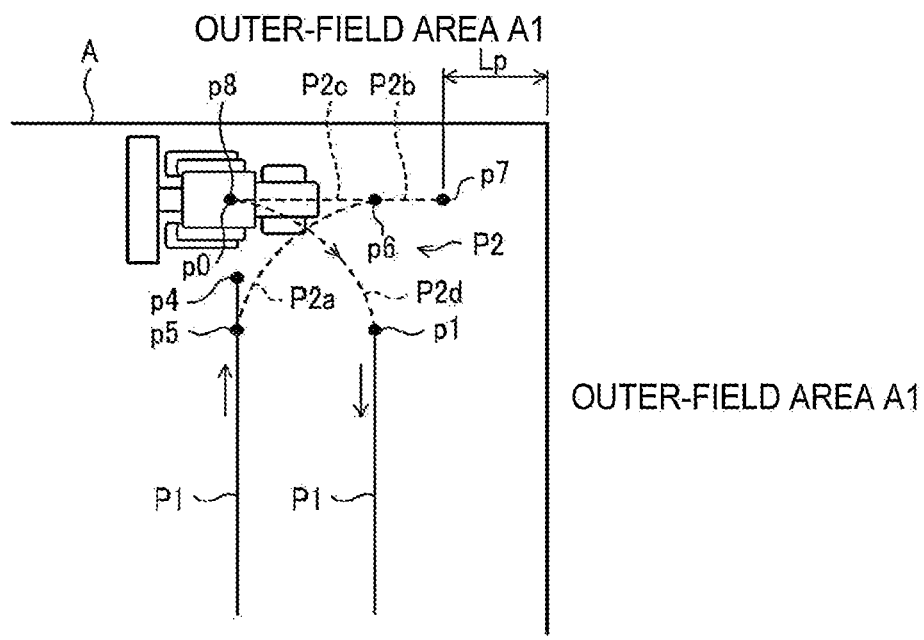
FIG. 20C is a view showing the traveling state in the case where the work vehicle according to the embodiment of the present invention changes its direction at the right end of the field.

On the direction change route P2 shown in FIGS. 19A to 19C, the automatic traveling controller 23F executes a deceleration processing of decelerating the target speed of the tractor 1 toward the end position p8 if a distance Lp between the end position p8 (the direction change position) at which the front-rear direction of the tractor 1 is changed and the outer-field area A1 (the left end of the field A) in the traveling direction (the left side) of the tractor 1 immediately before the tractor 1 reaches the end position p8 is less than a predetermined distance Lth in a case where the tractor 1 moves backward on the left backward-movement route P2*c* toward the outer-field area A1 (the left end of the field A).

For example, the automatic traveling controller 23F executes the deceleration processing such that the tractor 1 moving backward on the left backward-movement route P2*c* is brought into a zero speed state (a stop state) at the end position p8 (see FIG. 19C). This can prevent the tractor 1 from moving out of the outer-field area A1. Note that the predetermined distance Lth is set in advance based on the length of the direction change route P2 (for example, the left backward-movement route P2*c*) and the target vehicle speed of the tractor 1.

On the other hand, the automatic traveling controller 23F does not execute the deceleration processing if the distance Lp between the end position p8 (the direction change position) at which the front-rear direction of the tractor 1 is changed and the outer-field area A1 (the left end of the field A) in the traveling direction (the left side) of the tractor 1 immediately before the tractor 1 reaches the end position p8 is the predetermined distance Lth or more in a case where the tractor 1 moves backward on the left backward-movement route P2*c* toward the outer-field area A1 (the left end of the field A) (see FIG. 19B). In addition, the automatic traveling controller 23F does not execute the deceleration processing in a case where the tractor 1 moves forward on the right forward-movement route P2*b* away from the outer-field area A1 (the left end of the field A). In this case, the automatic traveling controller 23F changes the direction of the tractor 1 at a predetermined speed, and outputs, to the tractor 1, a switching instruction for switching forward/backward movement at a predetermined position on the direction change route P2. Accordingly, the time required for the tractor 1 to change its direction can be shortened. For example, even if the tractor 1 moves backward on the left backward-movement route P2*c* and moves out to the left beyond the target end position p8, entrance of the tractor 1 into the outer-field area A1 can be prevented.

Similarly, on the direction change route P2 shown in FIGS. 20A to 20C, the automatic traveling controller 23F executes a deceleration processing of decelerating the target speed of the tractor 1 toward the end position p7 if a distance Lp between the end position p7 (the direction change position) at which the front-rear direction of the tractor 1 is changed and the outer-field area A1 (the right end of the field A) in the traveling direction (the right side) of the tractor 1 immediately before the tractor 1 reaches the end position p7 is less than a predetermined distance Lth in a case where the tractor 1 moves forward on the right forward-movement route P2*b* toward the outer-field area A1 (the right end of the field A) (see FIG. 20B). For example, the automatic traveling controller 23F executes the deceleration processing such that the tractor 1 moving forward on the right forward-movement route P2*b* is brought into a zero speed state (a stop state) at the end position p7. This can prevent the tractor 1 from moving out of the outer-field area A1. Note that the predetermined distance Lth is set in advance based on the length of the direction change route P2 (for example, the right forward-movement route P2*b*) and the target vehicle speed of the tractor 1. Note that the predetermined distance Lth (see FIGS. 19A to 19C) in a case where the tractor 1 changes its direction while moving backward and the predetermined distance Lth (see FIGS. 20A to 20C) in a case where the tractor 1 changes its direction while moving forward may be set to different values. For example, the predetermined distance Lth is set to different values according to the length of the left backward-movement route P2*c* and the length of the right forward-movement route P2*b*.

On the other hand, the automatic traveling controller 23F does not execute the deceleration processing if the distance Lp between the end position p7 (the direction change position) at which the front-rear direction of the tractor 1 is changed and the outer-field area A1 (the right end of the field A) in the traveling direction (the right side) of the tractor 1 immediately before the tractor 1 reaches the end position p7 is the predetermined distance Lth or more in a case where the tractor 1 moves forward on the right forward-movement route P2b toward the outer-field area A1 (the right end of the field A) (see FIG. 20A). In addition, the automatic traveling controller 23F does not execute the deceleration processing in a case where the tractor 1 moves backward on the left backward-movement route P2c away from the outer-field area A1 (the right end of the field A). In this case, the automatic traveling controller 23F changes the direction of the tractor 1 at a predetermined speed, and outputs, to the tractor 1, a switching instruction for switching forward/backward movement at a predetermined position on the direction change route P2. Accordingly, the time required for the tractor 1 to change its direction can be shortened. For example, even if the tractor 1 moves forward on the right forward-movement route P2b and moves out to the right beyond the target end position p7, entrance of the tractor 1 into the outer-field area A1 can be prevented.

Note that in a case where the tractor 1 moves forward on the start-side turning route P2a (see FIGS. 19 and 20), the tractor 1 approaches a field area (the upper end of the field A). In this case, the tractor 1 travels to the right immediately before reaching the end position p7 at which the front-rear direction of the tractor 1 is switched, and therefore, the automatic traveling controller 23F determines the necessity of the deceleration processing based on the distance Lp between the end position p7 and the right end of the field A. That is, in this case, the automatic traveling controller 23F does not determine the necessity of the deceleration processing based on a distance between the end position p7 and the upper end of the field A. Note that in a case where the traveling direction of the tractor 1 immediately before the tractor 1 reaches the end position p7 at which the front-rear direction of the tractor 1 is switched is a direction toward the upper side, the automatic traveling controller 23F determines the necessity of the deceleration processing based on a distance between the end position p7 and the upper end of the field A.

Here, the direction change route P2 is not limited to the fishtail-shaped direction change route. The direction change route P2 may be, for example, a direction change route shown in FIG. 21 or 22.

Figure 21:
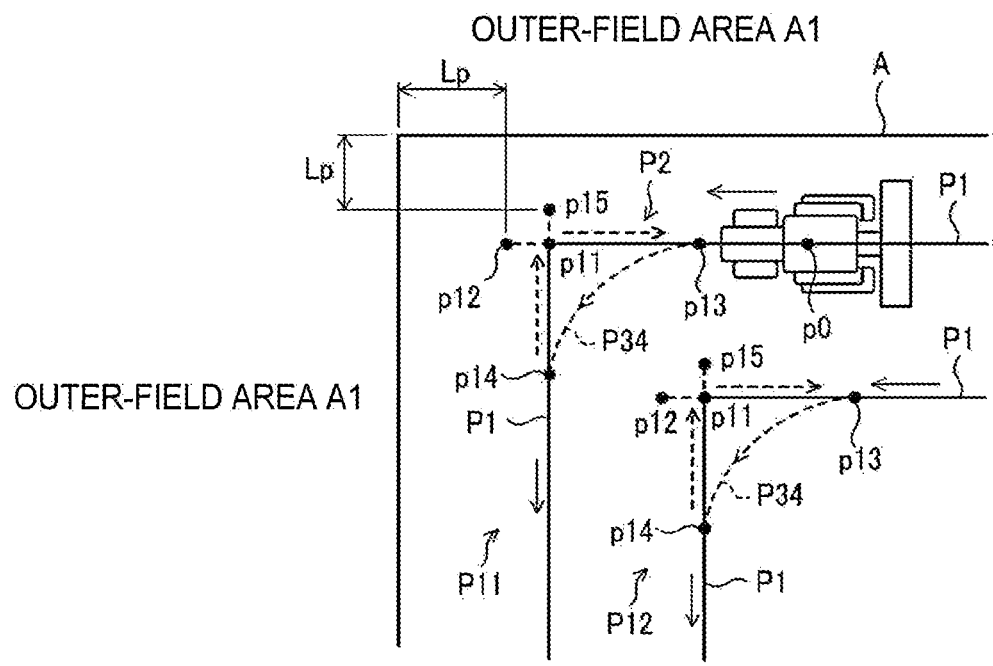
FIG. 21 is a view showing a traveling state of the work vehicle according to the embodiment of the present invention on another direction change route.

On the direction change route P2 shown in FIG. 21, when the tractor 1 travels to the left on the work route P1 and reaches a position p11, the tractor 1 stops the work and moves forward from the position 11 to a position 12, and when having reached the position 12, switches forward/backward movement and moves backward from the position p12 to a position p13. When reaching the position p13, the tractor 1 switches forward/backward movement, turns 90 degrees to the left from the position p13 while moving forward, and moves forward to a position p14. When reaching the position p14, the tractor 1 switches forward/backward movement, and moves backward to a position p15. When reaching the position p15, the tractor 1 switches forward/backward movement, and moves forward to the position p11. When reaching the position p11, the tractor 1 moves forward on the work route P1, and resumes the work.

On the direction change route P2 shown in FIG. 21, the automatic traveling controller 23F executes a deceleration processing of decelerating the target speed of the tractor 1 toward the position p12 if a distance Lp between the position p12 (the direction change position) at which the front-rear direction of the tractor 1 is switched and the outer-field area A1 (the left end of the field A) in the traveling direction (the left side) of the tractor 1 immediately before the tractor 1 reaches the position p12 is less than a predetermined distance Lth in a case where the tractor 1 moves forward on a left forward-movement route (a route from the position p11 to the position p12) toward the outer-field area A1 (the left end of the field A). For example, the automatic traveling controller 23F executes the deceleration processing such that the tractor 1 moving forward to the left is brought into a zero speed state (a stop state) at the position p12. The automatic traveling controller 23F executes a deceleration processing of decelerating the target speed of the tractor 1 toward the position p15 if a distance Lp between the position p15 (the direction change position) at which the front-rear direction of the tractor 1 is switched and the outer-field area A1 (the upper end of the field A) in the traveling direction (the upper side) of the tractor 1 immediately before the tractor 1 reaches the position p15 is less than a predetermined distance Lth in a case where the tractor 1 moves backward on an up backward-movement route (a route from the position p14 to the position p15) toward the outer-field area A1 (the upper end of the field A). For example, the automatic traveling controller 23F executes the deceleration processing such that the tractor 1 moving backward to the upper side is brought into a zero speed state (a stop state) at the position p15. This can prevent the tractor 1 from moving out of the outer-field area A1.

On the other hand, the automatic traveling controller 23F does not execute the deceleration processing in a case where the tractor 1 travels on the left forward-movement route (the route from the position p11 to the position p12) or the up backward-movement route (the route from the position p14 to the position p15) toward the outer-field area A1 (the left end or the upper end of the field A) and the distance Lp between the position p12 or the position p15 of the tractor 1 and the outer-field area A1 is the predetermined distance Lth or more (for example, in the case of the work route P12). In addition, the automatic traveling controller 23F does not execute the deceleration processing in a case where the tractor 1 travels on the right backward-movement route (the route from the position p12 to the position p13) or the left turning route (the route from the position p13 to the position p14) away from the outer-field area A1 (the left end or the upper end of the field A). In this case, the automatic traveling controller 23F changes the direction of the tractor 1 at a predetermined speed, and outputs, to the tractor 1, a switching instruction for switching forward/backward movement at a predetermined position on the direction change route P2. Accordingly, the time required for the tractor 1 to change its direction can be shortened. For example, even if the tractor 1 moves backward on the right backward-movement route and moves out to the right beyond the target position p13, entrance of the tractor 1 into the outer-field area A1 can be prevented. For example, even if the tractor 1 moves forward on the left forward-movement route (the route from the position p11 to the position p12) on the work route P12 and moves out to the left beyond the target position p12, entrance of the tractor 1 into the outer-field area A1 can be prevented.

Figure 22:
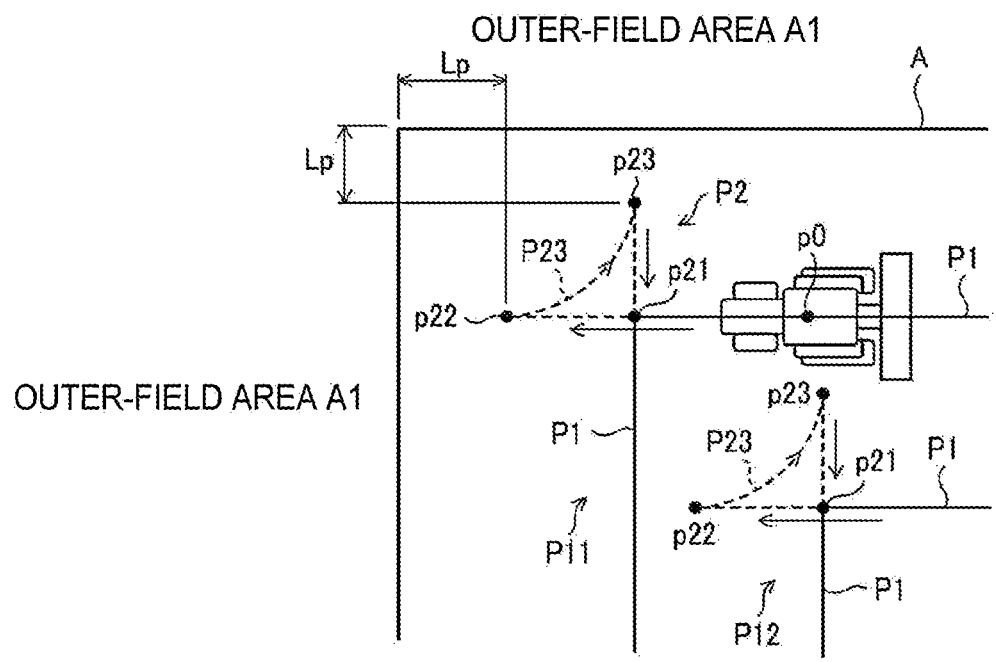
FIG. 22 is a view showing a traveling state of the work vehicle according to the embodiment of the present invention on still another direction change route.

On the direction change route P2 shown in FIG. 22, when the tractor 1 travels to the left on the work route P1 and reaches a position p21, the tractor 1 stops the work and moves forward from the position 21 to a position 22, and when having reached the position 22, switches forward/backward movement, turns 90 degrees to the right from the position p22 while moving backward, and moves backward to a position p23. When reaching the position p23, the tractor 1 switches forward/backward movement, and moves forward to the position p21. When reaching the position p21, the tractor 1 moves forward on the work route P1, and resumes the work.

On the direction change route P2 shown in FIG. 22, the automatic traveling controller 23F executes a deceleration processing of decelerating the target speed of the tractor 1 toward the position p22 if a distance Lp between the position p22 (the direction change position) at which the front-rear direction of the tractor 1 is switched and the outer-field area A1 (the left end of the field A) in the traveling direction (the left side) of the tractor 1 immediately before the tractor 1 reaches the position p22 is less than a predetermined distance Lth in a case where the tractor 1 moves forward on a left forward-movement route (a route from the position p21 to the position p22) toward the outer-field area A1 (the left end of the field A). For example, the automatic traveling controller 23F executes the deceleration processing such that the tractor 1 moving forward to the left is brought into a zero speed state (a stop state) at the position p22. The automatic traveling controller 23F executes a deceleration processing of decelerating the target speed of the tractor 1 toward the position p23 if a distance Lp between the position p23 (the direction change position) at which the front-rear direction of the tractor 1 is switched and the outer-field area A1 (the upper end of the field A) in the traveling direction (the upper side) of the tractor 1 immediately before the tractor 1 reaches the position p23 is less than a predetermined distance Lth in a case where the tractor 1 moves backward on an up turning route (a turning route from the position p22 to the position p23) toward the outer-field area A1 (the upper end of the field A). For example, the automatic traveling controller 23F executes the deceleration processing such that the tractor 1 turning to the upper side is brought into a zero speed state (a stop state) at the position p23. This can prevent the tractor 1 from moving out of the outer-field area A1.

On the other hand, the automatic traveling controller 23F does not execute the deceleration processing in a case where the tractor 1 travels on the left forward-movement route (the route from the position p21 to the position p22) or the up turning route (the route from the position p22 to the position p23) toward the outer-field area A1 (the left end or the upper end of the field A) and the distance Lp between the position p22 or the position p23 of the tractor 1 and the outer-field area A1 is the predetermined distance Lth or more (for example, in the case of the work route P12). In this case, the automatic traveling controller 23F changes the direction of the tractor 1 at a predetermined speed, and outputs, to the tractor 1, a switching instruction for switching forward/backward movement at a predetermined position on the direction change route P2. Accordingly, the time required for the tractor 1 to change its direction can be shortened. For example, even if the tractor 1 moves forward on the left forward-movement route (the route from the position p21 to the position p22) on the work route P12 and moves out to the left beyond the target position p22, entrance of the tractor 1 into the outer-field area A1 can be prevented.

As described above, the direction change route P2 of the tractor 1 is not particularly limited. In addition, the term "traveling direction" included in the "predetermined area in the traveling direction of the work vehicle immediately before the work vehicle reaches the direction change position" in the present invention includes a forward-movement direction in a case where the work vehicle (the tractor 1) moves forward, a backward-movement direction in a case where the work vehicle moves backward, a forward-movement direction in a case where the work vehicle turns while moving forward (forward turn), and a backward-movement direction in a case where the work vehicle turns while moving backward (backward turn). The "predetermined area" is an area into which the work vehicle enters when traveling (running) in the traveling direction. Note that on the above-described fishtail-shaped direction change route (see FIG. 6 and the like), the second forward-movement route P1c on which the tractor 1 further moves to the end position p4 and the relay backward-movement route P3 on which the tractor 1 moves backward from the end position p4 to the start position p5 of the direction change route may be omitted. That is, the tractor 1 may turn on the start-side turning route P2a after having moved forward on the work route P1 and reached the start position p5. The present invention can be applied to these fishtail-shaped direction change routes, direction change routes different from the fishtail-shaped routes, and the like.

As described above, when the tractor 1 changes its direction at the target speed on the direction change route R2, the automatic traveling controller 23F executes the deceleration processing when the tractor 1 enters the outer-field area A1. On the other hand, even when the tractor 1 changes its direction at the target speed on the direction change route R2, the automatic traveling controller 23F does not execute the deceleration processing if the tractor 1 does not enter the outer-field area A1. Thus, according to the automatic traveling system of the present embodiment, the work efficiency of the tractor 1 can be improved by properly changing the direction of the tractor 1.

Here, the automatic traveling controller 23F outputs a switching instruction for switching the traveling direction to the tractor 1 when the tractor 1 reaches a predetermined position. The automatic traveling controller 23F outputs the switching instruction to the tractor 1 to cause the tractor 1 to stop the work and cause the tractor 1 to travel a braking distance to the target position. The braking distance is a traveling distance from the position of the tractor 1 when the work is stopped until the tractor 1 is stopped.

The predetermined position may be a position at which the stop position at which the tractor 1 stops the work in response to the switching instruction (braking operation) and the vehicle speed reaches zero coincides with the target position, or may be a position beyond the target position in the traveling direction of the tractor 1.

Figure 7:
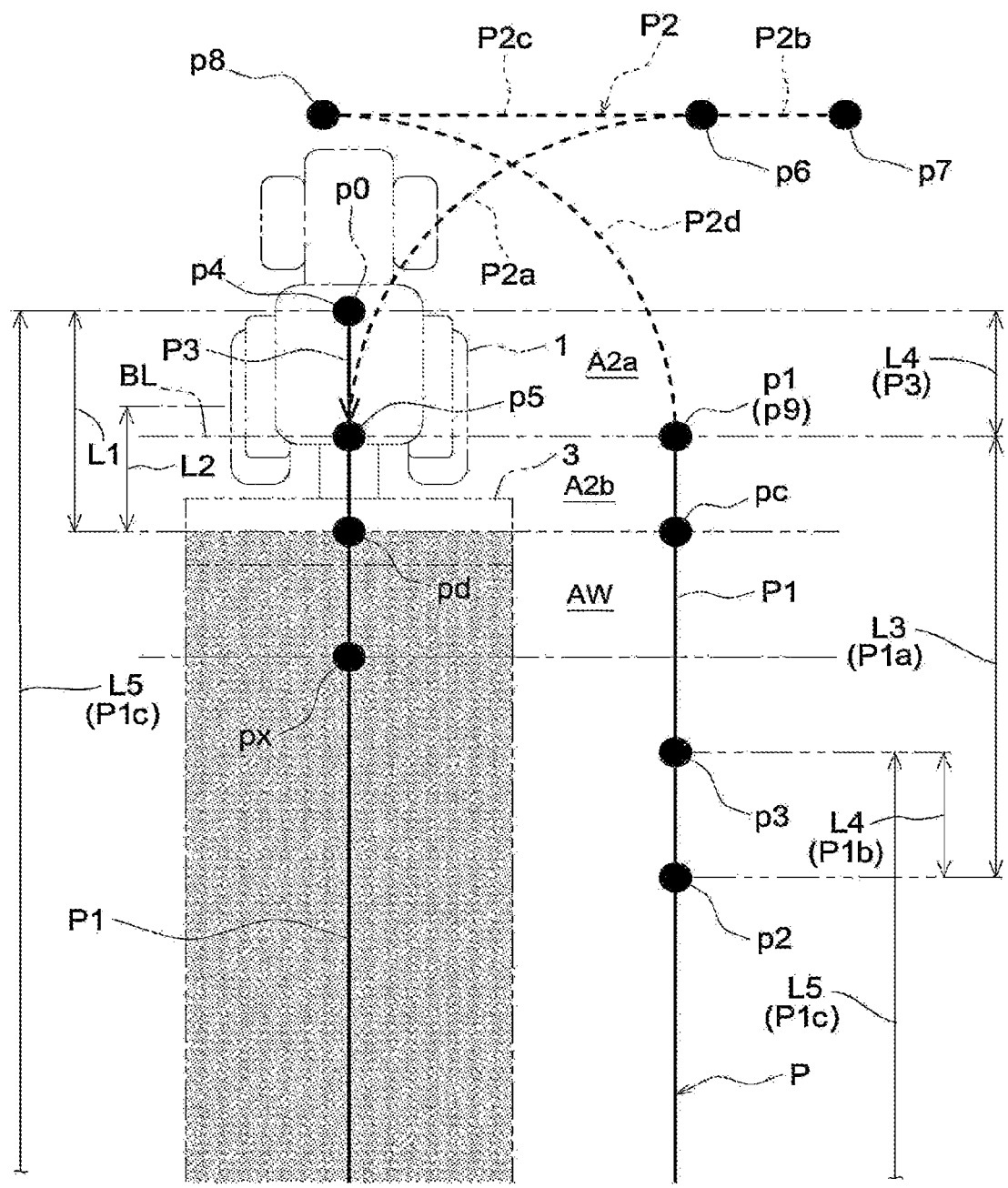
FIG. 7 is an enlarged view showing the target route in a state in which the work vehicle according to the embodiment of the present invention has reached an end position of the work route after having moved forward on the work route in the work traveling state.
Figure 8:
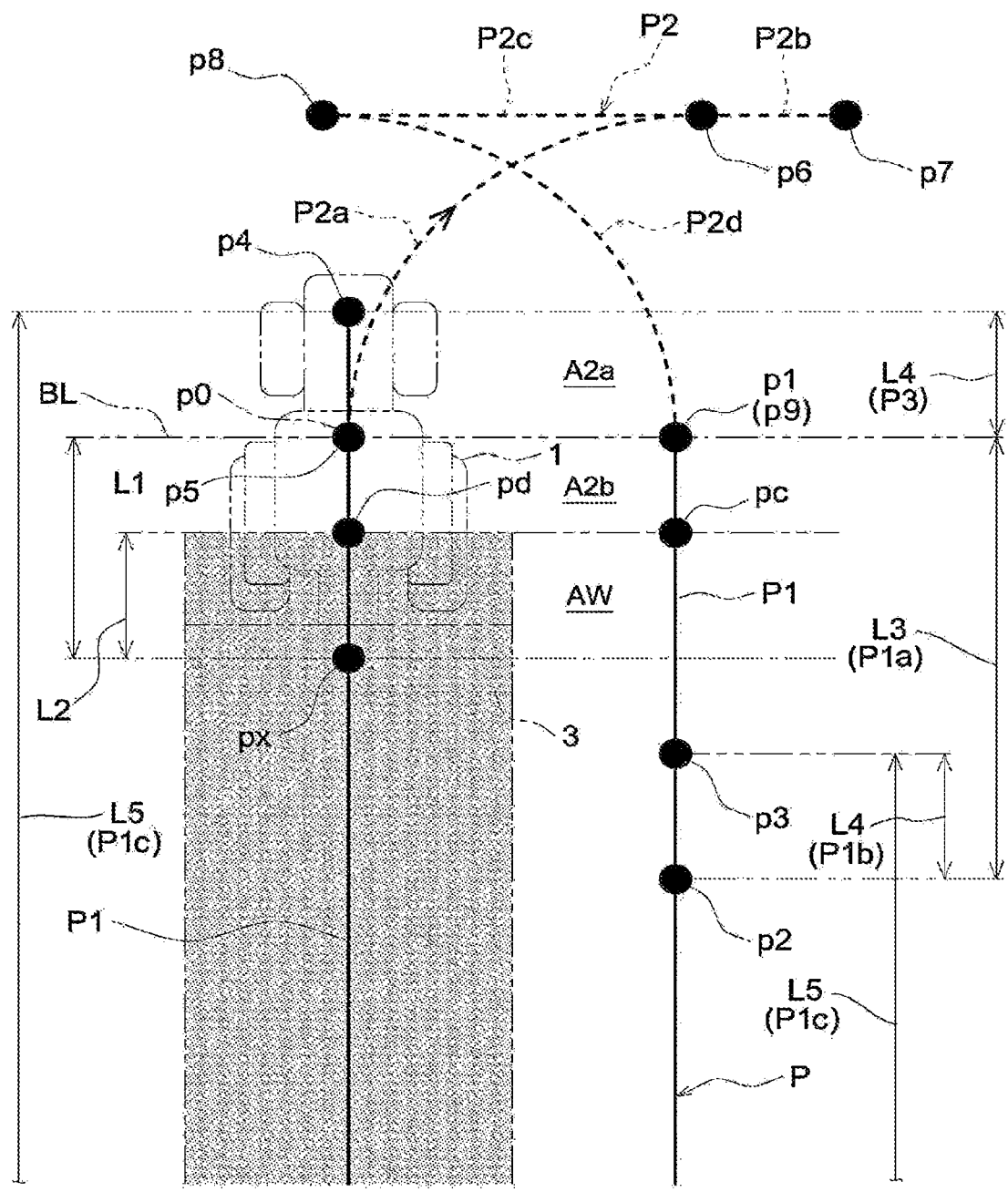
FIG. 8 is an enlarged view showing the target route in a state in which the work vehicle according to the embodiment of the present invention has reached a start position of a start-side turning route after having moved backward on a first backward-movement route in a non-work traveling state.

Here, in a case where the predetermined position is set on the near side with respect to the end of the work area (each work route), there may be a non-work area at the end of the work area. For example, as shown in FIG. 7, the switching instruction is output before the tractor 1 reaches the end of the work area such that the tractor 1 stops at the end position p4 when the vehicle speed of the tractor 1 reaches zero in response to the forward/backward movement switching instruction. Accordingly, the tractor 1 stops the work at the time of acquisition of the switching instruction, and therefore, an area from the position of the tractor 1 at the time of acquisition of the switching instruction to the end of the work area is the non-work area.

In order to reduce the non-work area, the automatic traveling controller 23F may be configured not to output the switching instruction to the tractor 1 while the tractor 1 is moving forward in the work area in a case where the tractor 1 performs the work while moving forward in the work area and changes its direction in the non-work area. In this case, the automatic traveling controller 23F may output the switching instruction when the rotary tilling equipment 3 moves beyond the work area, or may execute the deceleration processing when the rotary tilling equipment 3 moves beyond the work area.

Similarly, in a case where the tractor 1 moves backward on the backward-movement route P1b (see FIG. 13) and starts working at the work start position pc, the non-work area is preferably reduced. Thus, the automatic traveling controller 23F may be configured not to output the switching instruction to the tractor 1 while the tractor 1 is moving backward in the work area. In this case, the automatic traveling controller 23F may output the switching instruction when the rotary tilling equipment 3 moves beyond the work area, or may execute the deceleration processing when the rotary tilling equipment 3 moves beyond the work area.

According to these configurations, the non-work area can be reduced, and the work can be reliably performed across the entirety of the work area. In a case where the vehicle speed of the tractor 1 is not decreased in the work area, the work speed is improved, so that the work efficiency can be improved.

While the tractor 1 is automatically traveling along the second forward-movement route (the work route) P1c of the parallel route P1, the automatic traveling controller 23F may perform a moving-out determination processing of comparing the braking distance calculated based on the vehicle speed of the tractor 1 with a straight-line distance from the tractor 1 to the end of the field in the detection information from the front obstacle sensor 86 to determine whether or not the tractor 1 is likely to move out to the outer-field area A1. In the moving-out determination processing, in a case where the automatic traveling controller 23F determines that the tractor 1 is likely to move out to the outer-field area A1, the automatic traveling controller 23F performs the deceleration processing of the tractor 1 for the shift unit controller 23B and the like in order to prevent the tractor 1 from moving out to the outer-field area A1. In addition, the automatic traveling controller 23F may perform emergency stop processing in a case where the automatic traveling controller 23F determines that the tractor 1 is likely to move out to the outer-field area A1 and the tractor 1 cannot turn safely.

While the tractor 1 is automatically traveling on the second forward-movement route (the work route) P1c of the parallel route P1, the automatic traveling controller 23F may execute vehicle a vehicle speed limit control of limiting the vehicle speed of the tractor 1 via the shift unit controller 23B such that a state in which the calculated braking distance is shorter than a distance obtained by subtracting a set distance for preventing the tractor 1 from moving out from the straight-line distance is maintained.

Accordingly, while the second forward-movement route (the work route) P1c of the parallel route P1 on which the target vehicle speed is set higher than that on the direction change route P2 or the like is extended to the field end, degradation of the work efficiency due to a determination of the tractor 1 being likely to move out to the outer-field area A1 in the moving-out determination processing and the emergency stop of the tractor 1 can be prevented.

Note that the present invention may be taken as an invention relating to a method (an automatic traveling method) for executing part or the entirety of the deceleration processing by the in-vehicle control unit 23 or an invention relating to a program (an automatic traveling program) for causing the in-vehicle control unit 23 to execute part or entirety of the method. The deceleration processing may be executed by one or more processors.

For example, the automatic traveling method is a method causing one or more processors to execute generating the target route P including the work route P1 on which the tractor 1 moves forward on the field A and the direction change route P2 on which the tractor 1 changes its direction, measuring the position of the tractor 1, causing the tractor 1 to automatically travel along the target route P based on the position of the tractor 1, and executing a deceleration processing of decelerating the target speed of the tractor 1 toward the direction change position if the direction change position at which the front-rear direction of the tractor 1 is switched is within the predetermined distance from the predetermined area in the traveling direction of the tractor 1 immediately before the tractor 1 reaches the direction change position in a case where the tractor 1 changes its direction on the direction change route R2.

For example, the automatic traveling program is a program causing one or more processors to execute generating the target route P including the work route P1 on which the tractor 1 moves forward on the field A and the direction change route P2 on which the tractor 1 changes its direction, measuring the position of the tractor 1, causing the tractor 1 to automatically travel along the target route P based on the position of the tractor 1, and executing a deceleration processing of decelerating the target speed of the tractor 1 toward the direction change position if the direction change position at which the front-rear direction of the tractor 1 is switched is within the predetermined distance from the predetermined area in the traveling direction of the tractor 1 immediately before the tractor 1 reaches the direction change position in a case where the tractor 1 changes its direction on the direction change route P2. The automatic traveling program is non-temporarily recorded in a computer-readable recording medium such as a CD or a DVD, is read by reading equipment (not shown), such as a CD drive or a DVD drive, provided in the tractor 1, and is stored in the in-vehicle storage 23G. Note that the automatic traveling program may be downloaded from a server (not shown) to the tractor 1 via a communication network N1 and be stored in the in-vehicle storage 23G. The in-vehicle control unit 23 functions as various processors as described above by executing various types of processing according to the automatic traveling program.

Other Embodiments

Other embodiments of the present invention will be described.

Note that the configurations of the embodiments described below are not limited to being applied alone, and can be applied in combination with configurations of different other embodiments.

(1) An automatic traveling system may include a positioning unit, a target route generator, and a control unit. The positioning unit measures the position of a work vehicle on which work equipment switchable between a work state and a non-work state is provided at a rear portion. The target route generator generates a target route on which the work vehicle can automatically travel. The control unit causes the work vehicle to automatically travel along the target route based on positioning information from the positioning unit. The target route includes a work route on which the work vehicle moves forward with the work equipment switched to the work state, and a direction change route on which the work vehicle changes its direction with the work equipment switched to the non-work state. The target route generator generates the target route with such a route setting that a plurality of work routes arranged in parallel at predetermined intervals is connected in the order of traveling of the work vehicle via a plurality of direction change routes. The target route generator extends an end side of the work route by a predetermined length such that the end side of the work route enters the direction change route by the predetermined length, and generates a first backward-movement route on which the work vehicle moves backward from an end position of the extended work route to a start position of the direction change route. The control unit switches the work equipment from the work state to the non-work state based on switching of a route on which the work vehicle travels from the work route to the first backward-movement route.

(2) The predetermined length may be set to a length based on a separation distance from traveling equipment provided in the work vehicle to the work equipment.

(3) The target route generator may set a start position of the work route such that the position of the work equipment when the work vehicle of which the direction has been changed reaches the start position of the work route coincides with the position of the work equipment when the work vehicle reaches the end position of the extended work route.

(4) The target route generator may generate a non-work route extending from the end position of the direction change route beyond the start position of the work route and a second backward-movement route on which the work vehicle moves backward from a rear end position of the non-work route to the start position of the work route.

(5) The target route generator may set a switching position at which the route on which the work vehicle travels is switched from the work route to the first backward-movement route along with arrival of the work vehicle to a position before the end position of the work route by a braking distance corresponding to a target vehicle speed of the work vehicle.

(6) The control unit may decrease the target vehicle speed as the work vehicle approaches the end position of the work route.

(7) Various changes can be made to the configuration of the tractor 1. For example, the tractor 1 may have semi-crawler specifications, which includes, as the traveling equipment, the right and left front wheels 10 and right and left crawlers instead of the right and left rear wheels 11. For example, the tractor 1 may have full-crawler specifications, which includes, as the traveling equipment, right and left crawlers instead of the right and left front wheels 10 and the right and left rear wheels 11. In these configurations, the predetermined length L4 by which each second forward-movement route (the work route) P1c is extended is assumed to be set based on the separation distance from the rear end of each crawler to the work equipment such as the rotary tilling equipment 3. For example, the tractor 1 may have electric specifications, which includes, as a driver, an electric motor instead of the engine. For example, the tractor 1 may have hybrid specifications, which includes, as a driver, an engine and an electric motor.

(8) The second separation distance L2 from the rear wheel (the traveling equipment) 11 to the rotary tilling equipment 3 may be set to, for example, a distance from the rear end of a grounding surface of the rear wheel 11 to the work position of the rotary tilling equipment 3. In this case, the predetermined length L4 by which each second forward-movement route (the work route) P1c is extended may be set to the same length as the second separation distance L2.

Figure 23:
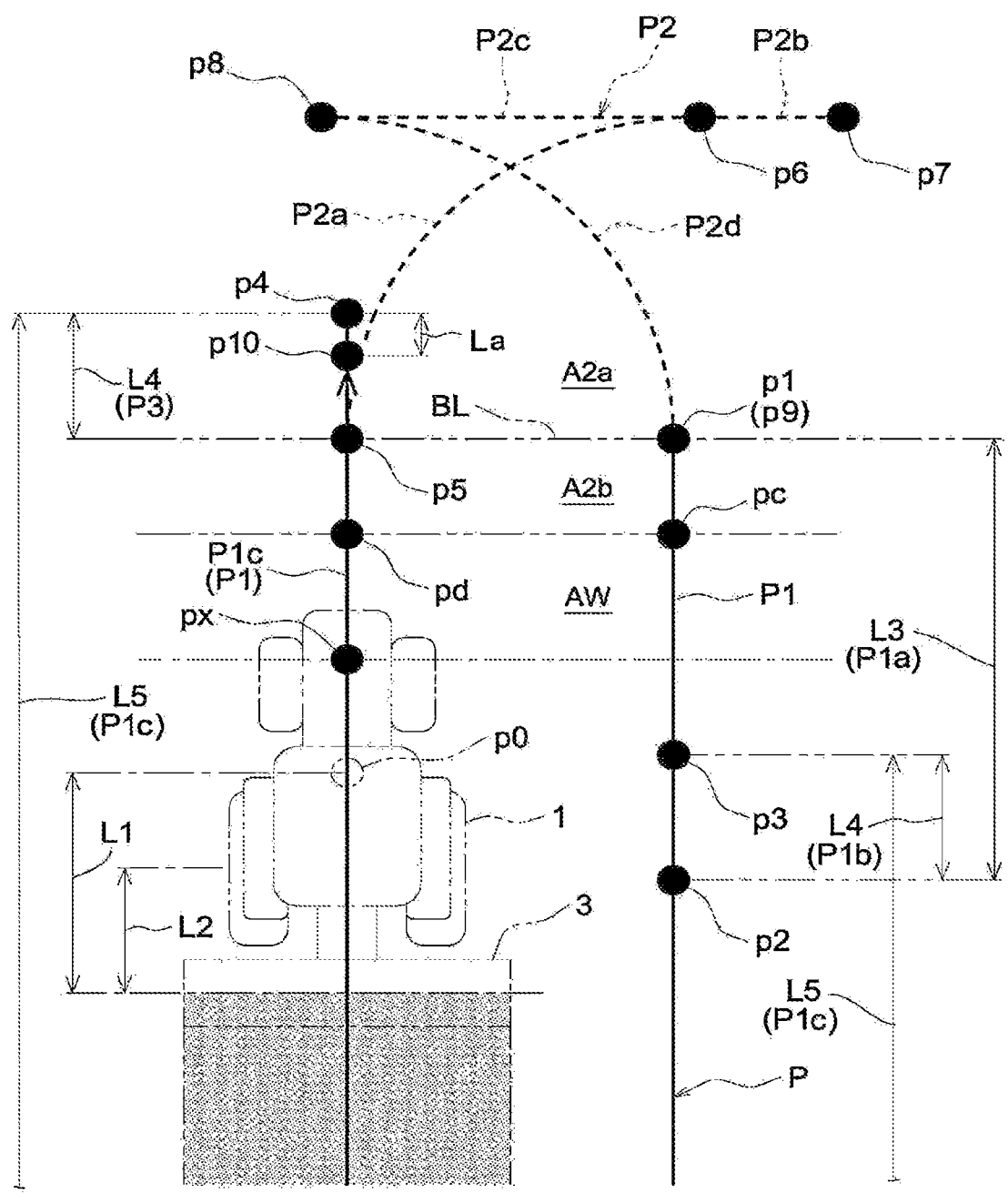
FIG. 23 is an enlarged view of a target route in another embodiment in which a switching position is set to a position on a near side as compared to the end position on the work route according to the embodiment of the present invention.

(9) As shown in FIG. 23, on the second forward-movement route (the work route) P1c of each parallel route P1, a switching position p10 at which the route on which the tractor 1 travels is switched from the second forward-movement route P1c to the relay backward-movement route P3 along with arrival of the tractor 1 may be set to a position before the end position p4 of the second forward-movement route P1c by a braking distance La corresponding to the target vehicle speed of the tractor 1 on the second forward-movement route P1c.

Another embodiment (9) will be described. In a case where the forward/backward movement switching operation is performed for the tractor 1, a distance (a braking distance for switching of forward/backward movement) allowing movement of the tractor 1 until completion of the forward-backward movement switching operation after the start of the forward-backward movement switching operation is required. Thus, as described above as an example in the embodiment, if the route on which the tractor 1 travels is set to be switched from the second forward-movement route P1c to the relay backward-movement route P3 when the tractor 1 reaches the end position p4 of the second forward-movement route P1c, the tractor 1 unnecessarily overruns beyond the end position p4 of the second forward-movement route P1c by the braking distance. Since such overrun is longer as the vehicle speed of the tractor 1 increases, the higher the target vehicle speed of the tractor 1 set on the second forward-movement route P1c is, the more the work efficiency is degraded due to unnecessary overrun.

For this reason, in another embodiment (9), the switching position p10 is set to the position before the end position p4 of the second forward-movement route P1c by the braking distance as shown in FIG. 23. This can prevent the tractor 1 from unnecessarily overrunning beyond the end position p4 of the second forward-movement route P1c, and can avoid degradation of the work efficiency and the like due to unnecessary overrunning.

Note that in addition to the second forward-movement route (the work route) P1c of each parallel route P1, another embodiment (9) may be applied to the first forward-movement route P1a or the backward-movement route P1b of the parallel route P1, each relay backward-movement route P3, and the right forward-movement route P2b or the left backward-movement route P2c of each direction change route P2, which relate to switching of the tractor 1 between forward movement and backward movement.

(10) By merely setting the switching position p10 as described as an example in another embodiment (9), the automatic traveling controller 23F switches, as described above, the rotary tilling equipment 3 from the work state to the non-work state based on the switching of the route on which the tractor 1 travels from the second forward-movement route P1c to the relay backward-movement route P3. Thus, the higher the target vehicle speed on the second forward-movement route P1c is, the shorter the distance that the tractor 1 works while automatically traveling on the second forward-movement route P1c is.

For this reason, in another embodiment (10), in addition to another embodiment (9), the automatic traveling controller 23F performs a target vehicle speed decreasing processing of decreasing the target vehicle speed on the work route as the tractor 1 approaches the end position p4 of the second forward-movement route P1c.

With this configuration, as the tractor 1 approaches the end position p4 of the second forward-movement route P1c, the vehicle speed of the tractor 1 can be decreased, and the above-described braking distance La can be shortened. As a result, the distance that the tractor 1 works while automatically traveling on each second forward-movement route P1c can be increased.

Thus, the work area Aw in a case where the tractor 1 works while automatically traveling can be expanded without, e.g., degradation of the work efficiency due to overrun of the tractor 1 beyond the second forward-movement route P1c, and the work efficiency can be improved.

(11) In another embodiment (10), in addition to the configuration described as an example in another embodiment (9), the configuration has been described as an example, in which the automatic traveling controller 23F performs the target vehicle speed decreasing processing. Instead, the automatic traveling controller 23F may be configured to calculate a braking time required until the tractor 1 is switched to the backward-movement state after having reached the switching position p10 based on detection by the vehicle speed sensor 22E when the tractor 1 reaches the switching position p10 and switch the traveling state of the tractor 1 from the work traveling state to the non-work traveling state at a timing after a lapse of the braking time from arrival of the tractor 1 at the switching position p10 or a timing slightly before a lapse of the braking time.

With this configuration, the tractor 1 can be maintained in the work traveling state until the braking time elapses or until slightly before the braking time elapses even after the tractor 1 has reached the switching position p10, and the work efficiency can be improved by expansion of the work area Aw.

(12) In addition to the configuration described as an example in another embodiment (9), the automatic traveling controller 23F may start a traveling state switching control of switching the traveling state of the tractor 1 from the work traveling state to the non-work traveling state based on detection by the vehicle speed sensor 22E when the tractor 1 reaches the switching position p10, and in the traveling state switching control, may switch the traveling state of the tractor 1 from the work traveling state to the non-work traveling state at a timing when switching of the tractor 1 from the forward-movement state to the backward-movement state is sensed based on detection by the vehicle speed sensor 22E.

With this configuration, the tractor 1 can be maintained in the work traveling state until the tractor 1 actually starts moving backward even after the tractor 1 has reached the switching position p10, and the work efficiency can be improved by expansion of the work area Aw.

The invention claimed is:

1. An automatic traveling method executing:
generating a target route including a work route on which a work vehicle moves forward on a field and a direction change route on which the work vehicle changes its direction;
measuring the position of the work vehicle;
causing the work vehicle to automatically travel along the target route based on the position of the work vehicle; and
executing a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

2. The automatic traveling method according to claim 1, wherein the deceleration processing is not executed in a case where the direction change position of the work vehicle is equal to or more than the predetermined distance from the predetermined area in the traveling direction of the work vehicle immediately before the work vehicle reaches the direction change position.

3. The automatic traveling method according to claim 1, wherein when the work vehicle changes its direction at the target speed on the direction change route, the deceleration processing is executed if the work vehicle enters the predetermined area.

4. The automatic traveling method according to claim 1, wherein even when the work vehicle changes its direction at the target speed on the direction change route, the deceleration process is not executed if the work vehicle does not enter the predetermined area.

5. The automatic traveling method according to claim 4, wherein a switching instruction for switching the traveling direction is output to the work vehicle when the work vehicle reaches a predetermined position.

6. The automatic traveling method according to claim 5, wherein the switching instruction is output to the work vehicle to cause the work vehicle to stop working and cause the work vehicle to travel a braking distance to a target position.

7. The automatic traveling method according to claim 5, wherein in a case where the work vehicle works while moving forward on a work area and changes its direction on a non-work area, the switching instruction is not output to the work vehicle while the work vehicle is moving forward on the work area.

8. The automatic traveling method according to claim 7, wherein the switching instruction is not output to the work vehicle while the work vehicle is moving backward on the work area.

9. An automatic traveling system comprising:
a route generation processor that generates a target route including a work route on which a work vehicle moves forward on a field and a direction change route on which the work vehicle changes its direction;
a positioning processor that measures a position of the work vehicle; and
a traveling processor that causes the work vehicle to automatically travel along the target route based on positioning information from the positioning processor,
wherein the traveling processor executes a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

10. A computer-readable non-transitory medium storing an automatic traveling program causing one or more processors to execute:
generating a target route including a work route on which a work vehicle moves forward on a field and a direction change route on which the work vehicle changes its direction;
measuring the position of the work vehicle;

causing the work vehicle to automatically travel along the target route based on the position of the work vehicle; and executing a deceleration processing of decelerating a target speed of the work vehicle toward a direction change position at which a front-rear direction of the work vehicle is switched if the direction change position is within a predetermined distance from a predetermined area in a traveling direction of the work vehicle immediately before the work vehicle reaches the direction change position in a case where the work vehicle changes its direction on the direction change route.

* * * * *